United States Patent
Nakahara et al.

(10) Patent No.: US 6,239,855 B1
(45) Date of Patent: May 29, 2001

(54) METHOD FOR PRODUCING A LIQUID CRYSTAL DISPLAY PANEL HAVING DUMMY SEAL PARTICLES ARRANGED IN AT LEAST TWO ARRAYS

(75) Inventors: Makoto Nakahara, Nara; Kyouhei Isohata, Yamatokoriyama; Daisuke Ikesugi, Joyo; Manabu Ano, Yamatokoriyama; Kazuya Yoshimura, Nara; Yoshihiro Shirai, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/136,576

(22) Filed: Aug. 19, 1998

(30) Foreign Application Priority Data

| Aug. 25, 1997 | (JP) | ................................................ 9-228609 |
| Sep. 26, 1997 | (JP) | ................................................ 9-261516 |
| Jun. 2, 1998 | (JP) | ................................................ 10-152357 |

(51) Int. Cl.⁷ ................................................ G02F 1/1339
(52) U.S. Cl. ................................................ 349/153; 349/190
(58) Field of Search ................................ 349/153, 154, 349/190, 155

(56) References Cited

U.S. PATENT DOCUMENTS

| 5,317,434 | * | 5/1994 | Ohara | ...................... 349/153 |
| 5,410,423 | * | 4/1995 | Furushima et al. | ............... 349/158 |
| 5,757,450 | * | 5/1998 | Fujii et al. | ............................ 349/106 |

FOREIGN PATENT DOCUMENTS

| 63-210913 | * | 9/1988 | (JP) | ...................... 349/153 |
| 01009416 | | 1/1989 | (JP) . | |
| 05188387 | | 7/1993 | (JP) . | |
| 08313917 | | 11/1996 | (JP) . | |

* cited by examiner

*Primary Examiner*—Walter J. Malinowski
(74) *Attorney, Agent, or Firm*—David G. Conlin; Steven M. Jensen; Dike, Bronstein, Roberts & Cushman, Intellectual Property Practice Group

(57) ABSTRACT

A method for producing a liquid crystal display panel of the present invention includes the steps of: forming a plurality of injection seals on at least one of a pair of substrates, the injection seals defining a liquid crystal injection area; forming a dummy seal of dispersed sealant particles outside the liquid crystal injection area; attaching the substrates to each other thereby sandwiching the injection seal and the dummy seal therebetween; and injecting a liquid crystal material into the liquid crystal injection area formed between the pair of substrates.

25 Claims, 19 Drawing Sheets

Near edge

Near corner

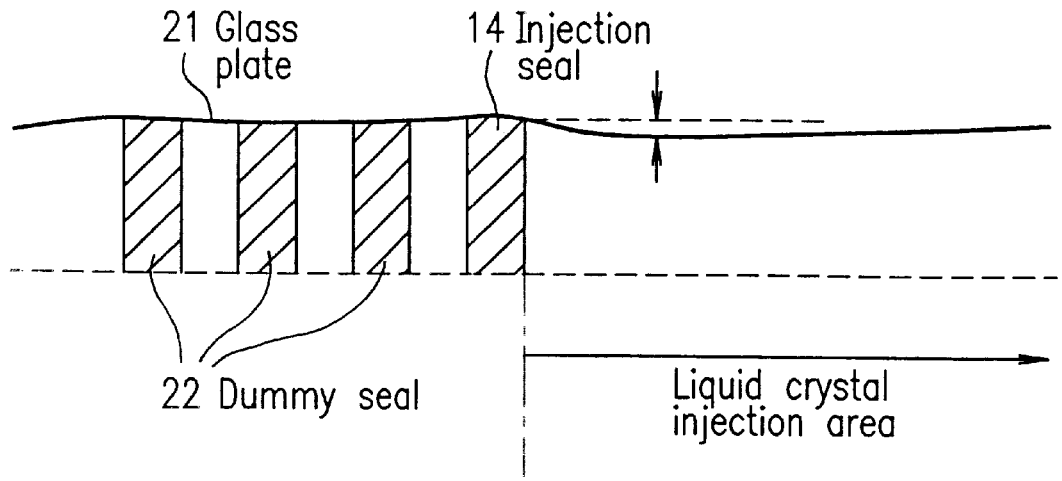
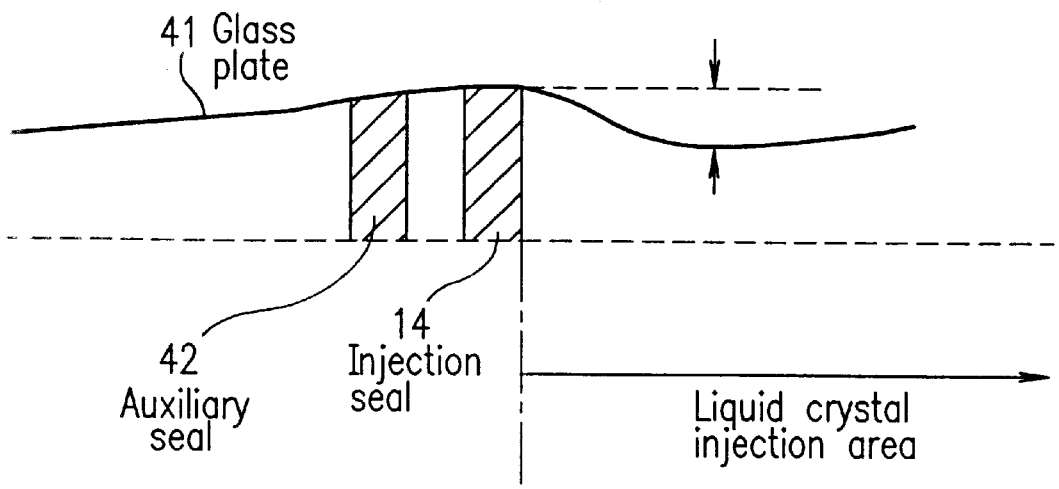

METHOD FOR PRODUCING A LIQUID CRYSTAL DISPLAY PANEL HAVING DUMMY SEAL PARTICLES ARRANGED IN AT LEAST TWO ARRAYS

BACKGROUND OF THE INVENTION

1. Field of the Invention

The present invention relates to a method for producing a liquid crystal display panel.

2. Description of the Related Art

In recent years, there have been demands in the market for: a liquid crystal display panel capable of displaying motion pictures for use in personal computers and multimedia applications; a liquid crystal display panel capable of performing a high definition display (e.g., SVGA or XGA) and performing a large screen display; and a large liquid crystal display panel which can be used in place of a CRT in a desk-top computer system. In order to meet such demands, it is required for a liquid crystal display panel, especially an STN (Super Twisted Nematic) color liquid crystal display panel, to have high performance characteristics such as a high contrast (e.g., 30:1 or greater), a high brightness, a high response speed (e.g., a response time of 200 ms or less), a high display quality and a low power consumption.

The quality display characteristic, among other characteristics, is difficult to improve since it is in a trade-off relationship with high contrast and high brightness. Moreover, as the response speed of a liquid crystal display is improved, the quality display characteristic has to be improved under more demanding conditions. Equalizing the cell gap of the display panel (corresponding to the distance between a pair of substrates) has been one way of improving the quality display characteristic, the cell gap issue being one of the highest priority display problems. One particular problem which is associated with the cell gap non-uniformity which must be solved is the color irregularity seen near an injection seal, where the cell gap is more likely to be non-uniform.

According to a well-known method, a liquid crystal display panel is produced by: printing a plurality of injection seals on one of a pair of substrates so as to surround a plurality of liquid crystal injection areas (corresponding to a plurality of liquid crystal cells); attaching the substrate to the other substrate and pressing the substrates together; and severing the substrates into a plurality of liquid crystal cells.

As the area of a single liquid crystal cell increases, however, the number of liquid crystal cells produced from a pair of substrates decreases, thereby also decreasing the total area of the injection seals. As a result, an excessive load may be applied on the injection seal during the pressing process. In such a case, when the injection seal is heated and cured after the pressing process, the injection seal greatly expands and changes its shape. Moreover, such an excessive load may also deform the gap material, thereby reducing the production yield and significantly increasing the cost of the product.

In order to solve such problems, Japanese Laid-open Publication No. 64-9426 describes: providing an auxiliary seal around an injection seal on one of a pair of substrates; attaching the substrate to the other substrate; scribing and breaking the substrate; and removing the auxiliary seal, thus producing at least one liquid crystal cell. This publication does not particularly pursue a preferred shape of the auxiliary seal, but only describes that the seal can take a shape such as a triangle, a rectangle, a pentagon, other polygons, a circle or an ellipse. The publication further describes that the auxiliary seal is preferably formed in such a manner that a load is applied uniformly on the injection seal when the pair of substrates are attached together. However, this publication does not describe the precision (uniformity) of the cell gap in the vicinity of the injection seal when the panel is completed. In fact, it was not possible to equalize the cell gap of the panel in the vicinity of the injection seal when the auxiliary seal, as described in this publication, was provided, for example, in the vicinity of the injection seal.

Japanese Laid-open Publication No. 8-313917 describes an injection seal in a rectangular pattern surrounding a liquid crystal injection area, wherein the rectangular pattern has a relatively small width along each of the short sides thereof and a relatively large width along each of the long sides thereof. This structure prevents the deformation of the liquid crystal injection area due to the difference in load per unit area between the short side and the long side of the rectangular pattern which occurs when the pair of substrates are pressed together. This publication further describes an auxiliary seal provided in a linear pattern around the injection seal. However, it was not possible to equalize the cell gap of the panel in the vicinity of the injection seal by following the description of this publication (i.e., by providing an injection seal in a rectangular pattern surrounding a liquid crystal injection area, with a relatively small width along each of the short sides thereof and a relatively large width along each of the long sides thereof).

It is not possible to sufficiently diffuse the stress acting upon each substrate by providing an auxiliary seal in a large pattern or by providing an auxiliary seal in a linear pattern. It should also be noted that, when attaching the substrates together, the air therebetween is discharged more easily through some positions in the substrate than through other positions thereof. Moreover, when attaching the substrates together, there occurs a difference in the amount of expansion between the auxiliary seals, thereby making the cell gap non-uniform.

Japanese Laid-open Publication No. 5-188387 discloses another method which prevents the cell gap non-uniformity or a crack in the substrate from occurring in the severing process. In accordance with this method, a thermosetting adhesive mixed with hard spacers such as glass beads is applied on one of the substrates by a screen printing method or by using a dispenser so as to form an injection seal (along the periphery of a liquid crystal panel) and an auxiliary seal for preventing the substrates from being peeled from each other (in an area outside the liquid crystal panel, which area is to be severed from the panel). Relatively soft spacers such as plastic beads are dispersed on the entire surface of the other substrate. Then, an UV-curable adhesive is applied on the area outside the liquid crystal panel which is to be severed from the panel so as to form a temporary securing section. Thereafter, the pair of substrates are attached together and irradiated with an UV radiation so as to cure the UV-curable adhesive and thus to temporarily secure the substrates together. A plurality of such pairs of substrates are stacked on top of one another and are pressed and heated so as to cure the thermosetting adhesive. Thus, a predetermined cell gap is obtained. Then, the pair of substrates is scribed and subjected to a break process so as to divide the substrates into a liquid crystal display panel and the remaining portion outside the liquid crystal display panel.

In accordance with the method disclosed in Japanese Laid-open Publication No. 5-188387, an injection seal 61 along the periphery of a liquid crystal display panel 60; an auxiliary seal 62 and a temporary securing section 63 provided in an outer area outside the liquid crystal, display panel 60; and a scribe line 64 between the liquid crystal display panel 60 and the outer area are provided in a positional relationship as illustrated in FIG. 21. One or two auxiliary seals 62 are provided in parallel with a side of the injection seal 61 with the same width as the width of the injection seal 61 of that side. For example, only one auxiliary seal 62 may be provided near the injection seal 61 or, alternatively, two auxiliary seals 62 may be provided; one near the injection seal 61 and the other near the temporary securing section 63. Each auxiliary seal 62 is formed in a linear pattern and is discontinuous wherever the scribe line 64 is present. The temporary securing section 63 is formed outside the auxiliary seal 62. The temporary securing section 63 does not overlaps with the scribe line 64 and is usually formed in the vicinity of the scribe line 64.

In accordance with the method disclosed in Japanese Laid-open Publication No. 5-188387, after the attachment process, the temporary securing section 63 has a circular shape with a diameter of about 5 mm and a thickness or height of about 10 μm or greater. This thickness is considerably greater than the cell gap of the liquid crystal display panel (e.g., about 6 μm). Moreover, the temporary securing section 63 is already cured in a pillar-like shape before the pressing and heating process. Therefore, despite the provision of the one or two linear auxiliary seals, the cell gap of this liquid crystal display panel rapidly increases near the temporary securing section 63.

Furthermore, it has been found that when the temporary securing section 63 is provided near the scribe line 64 and the linear auxiliary seal 62 is discontinuous in and near the area where the scribe line 64 is present, the stress distortion influence from the temporary securing section 63 is conducted to the inside of the liquid crystal display panel via sections where the linear auxiliary seal 62 is discontinuous. In such a case, a cell gap variation is caused in the vicinity of each corner of the liquid crystal display panel.

The temporary securing section 63 takes on such a thick pillar-like shape, as described above, because the temporary securing section 63, which consists of an UV-curable adhesive, is cured while the pair of substrates are attached together with a relatively weak force. This is believed to be causing the situation where the thickness of the temporary securing section 63 is not reduced to a predetermined cell gap of the liquid crystal display panel (even when the substrates are pressed and heated thereafter). It is believed that the cell gap of the liquid crystal display panel rapidly increases near the temporary securing section 63 because of the large area and the large thickness of the temporary securing section 63 and because of the great cell gap difference between the temporary securing section 63 and the injection seal 61 which makes the substrate wavy.

As described above, there is a need for a method for producing a liquid crystal display panel which provides a uniform cell gap in the vicinity of the injection seal and which reduces or eliminates the cell gap variation caused by, for example, the stress distortion due to the temporary securing section 63.

SUMMARY OF THE INVENTION

According to one aspect of this invention, a method for producing a liquid crystal display panel includes the steps of: forming a plurality of injection seals on at least one of a pair of substrates, the injection seals defining a liquid crystal injection area; forming a dummy seal of dispersed sealant particles outside the liquid crystal injection area; attaching the substrates to each other thereby sandwiching the injection seal and the dummy seal therebetween; and injecting a liquid crystal material into the liquid crystal injection area formed between the pair of substrates.

In one embodiment of the invention, the sealant particles are provided in a regular arrangement.

In one embodiment of the invention, the sealant particles each have a circular cross section.

In one embodiment of the invention, the method further includes, between the attachment step and the injection step, the step of scribing and breaking the pair of substrates so as to cut off an area where the dummy seal is formed.

In one embodiment of the invention, a scribe line is interposed between the injection seal and the dummy seal.

In one embodiment of the invention, a functional film is provided on at least one of the pair of substrates.

In one embodiment of the invention, the dummy seal is formed only on a portion of the functional film which is within an outer area outside the liquid crystal injection area; and a thickness of the functional film provided in the outer area is substantially the same as that of the functional film in an inner area within the injection seals.

In one embodiment of the invention, the functional film comprises a color filter.

In one embodiment of the invention, a color filter is provided on at least one of the pair of substrates; and a dummy seal is formed only on a portion of the color filter which is within an outer area outside the liquid crystal injection area.

In one embodiment of the invention, the liquid crystal display panel is an STN liquid crystal display panel or a ferroelectric liquid crystal display panel.

In accordance with another aspect of this invention, a method for producing a liquid crystal display panel includes the steps of: forming a plurality of injection seals on at least one of a pair of substrates, the injection seals defining a liquid crystal injection area; forming a dummy seal of dispersed sealant particles outside the liquid crystal injection area; forming a temporary securing section for temporarily securing the pair of substrate together; attaching the substrates to each other so as to sandwich the injection seal, the dummy seal and the temporary securing section therebetween, and allowing the temporary securing section to be cured; and scribing and breaking the pair of substrates along a scribe line so as to cut off an area where the dummy seal is formed. The dummy seal is formed by providing sealant particles having a predetermined shape in a regular arrangement.

In one embodiment of the invention, the method further includes, after the scribe and break step, the step of injecting a liquid crystal material into the liquid crystal display area formed between the substrates.

In one embodiment of the invention, the sealant particles have a circular cross section.

In one embodiment of the invention, the scribe line is interposed between the injection seal and the dummy seal.

In one embodiment of the invention, an external dimension of the dummy seal is equal to or less than a width of the injection seal.

In one embodiment of the invention, the width of the dummy seal is formed to have a width which is greater than equal to ½ of a minimum distance between the temporary securing section and the injection seal.

In one embodiment of the invention, the sealant particles are provided in three or more arrays between the temporary securing section and one of the injection seals which is closest to the temporary securing section.

In one embodiment of the invention, a functional film is provided on at least one of the pair of substrates.

In one embodiment of the invention, the dummy seal is formed only on a portion of the functional film which is within an outer area outside the liquid crystal injection area; and the thickness of the functional film provided in the outer area is substantially the same as that of the functional film in an inner area within the injection seals.

In one embodiment of the invention, the functional film comprises a color filter.

In one embodiment of the invention, the liquid crystal display panel is an STN liquid crystal display panel or a ferroelectric liquid crystal display panel.

Hereinafter, the function of the present invention will be described.

According to the method for producing a liquid crystal display panel of the present invention, a dummy seal of dispersed sealant particles is provided outside an injection seal, which surrounds a liquid crystal injection area. Therefore, when an injection seal is sandwiched between a pair of substrates, the dummy seal of dispersed sealant particles is also sandwiched therebetween. Thus, the substrates are supported by the sealant particles of the dummy seal, i.e., they are supported at a plurality of points. Therefore, the stress acting upon each substrate is diffused, thereby preventing the stress from localizing in the vicinity of the injection seal, and thus facilitating the equalization of the cell gap between the substrates. When a pair of substrates are attached to each other, air is discharged from the space therebetween. When the dummy seal is formed of sealant particles, the air is sufficiently diffused, whereby it is possible to attach the pair of substrates to each other while maintaining a uniform cell gap.

In a preferred embodiment, the sealant particles of the dummy seal are provided in a regular arrangement. Accordingly, the stress acting upon each substrate is sufficiently diffused. When the substrates are attached to each other, air is uniformly discharged from the space between the substrates, and the sealant particles expand uniformly. As a result, it is possible to provide a uniform cell gap.

Hereinafter, the advantage of the dummy seal of sealant particles will be described in greater detail. In an STN liquid crystal display panel or a ferroelectric liquid crystal display panel, display unevenness can be caused by even a very small cell gap variation due to an undulation of the substrate. Moreover, as the performance of a liquid crystal display panel has been improved in recent years, the demand for reducing or eliminating the display unevenness has been increasing. When a dummy seal of sealant particles is sandwiched between a pair of substrates, as in the present invention, the substrates are supported at a plurality of points. Therefore, the stress acting upon each substrate is diffused, thereby diffusing the stress acting upon each substrate and thus suppressing the undulation of the substrate.

The substrate is supported like a seesaw with each of the sealant particles being a fulcrum, and there are a plurality of such fulcrums, thereby maintaining the pair of substrates substantially parallel to each other and thus a uniform cell gap therebetween. The dummy seal is formed by printing a sealant on the substrate. In view of simplifying the printing process and ensuring a sufficient attachment strength between the substrates, it is preferable to provide the sealant particles of the dummy seal in a regular arrangement while forming each of the sealant particles precisely in terms of its shape. The diameter of each sealant particle may be as great as the width of the injection seal.

In a preferred embodiment, a color filter is provided on at least one of the pair of substrates, and a dummy seal is formed only on a portion of the color filter which is within an outer area outside the injection seals (the dummy color filter area). When the dummy seal is formed only in the dummy color filter area, the cell gap is not influenced by the thickness of the color filter (about 1 to 2 $\mu$m). The color filter may be formed with a plurality of hues or with a single color, or it may also be formed of a light blocking layer. Functional films (thin films) other than the color filter may also be formed on the substrate. Any influence of the provided functional film on the cell gap can be avoided by forming the dummy seal only on a portion of the functional film which is within an outer area outside the injection seals.

The present invention provides a method for producing a liquid crystal display panel, including the steps of: forming a plurality of injection seals on at least one of a pair of substrates, the injection seals defining a liquid crystal injection area; forming a dummy seal of dispersed sealant particles outside the injection seals; forming a temporary securing section for temporarily securing the pair of substrates together; attaching the substrates to each other so as to sandwich the injection seal, the dummy seal and the temporary securing section therebetween, allowing the temporary securing section to be cured; and scribing and breaking the pair of substrates along a scribe line so as to cut off an area where the dummy seal is formed, wherein the dummy seal is formed by providing sealant particles having a predetermined shape in a regular arrangement. Since the sealant particles each have a predetermined shape and are uniformly dispersed, it is possible to uniformly diffuse the stress distortion due to the pillar-like temporary securing section, thereby reducing the stress distortion influence on the liquid crystal display panel. As a result, it is possible to obtain a liquid crystal display panel in which the display color, the contrast, the response speed, or the like, are uniform across the display screen.

In a preferred embodiment, the sealant particles each have a circular cross section, whereby the stress distortion can be isotropically diffused, thus further reducing its influence on liquid crystal display panel. As a result, it is possible to obtain a liquid crystal display panel in which the display color, the contrast, the response speed, or the like, are even more uniform across the display screen.

In a preferred embodiment, the scribe line is interposed between the injection seal and the dummy seal. In other words, no sealant particles exist on the scribe line. Thus, it is possible to prevent the cell gap from increasing in the vicinity of the scribe line. Moreover, when the pair of substrates are subjected to a break process, after it is scribed, a bending stress is uniformly applied on the substrate so that the substrates each have a smooth cut face along the scribe line, thereby improving the breaking accuracy.

In a preferred embodiment, the external dimension of the dummy seal is equal to or less than the width of the injection seal. Thus, the contact area between the dummy seal and the substrate is reduced, thereby reducing the stress distortion.

In a preferred embodiment, the width of the dummy seal is formed to have a width which is greater than or equal to ½ of the shortest distance between the temporary securing section and the injection seal. Thus, the stress distortion and the waviness of the substrate due to the temporary securing section are mitigated.

In a preferred embodiment, the sealant particles are provided in three or more arrays between the temporary securing section and one of the injection seals which is closest to the temporary securing section. Thus, the stress distortion and the waviness of the substrate due to the temporary securing section are sufficiently mitigated.

In a preferred embodiment, a functional film is provided on at least one of the pair of substrates. More preferably, the dummy seal is formed only on a portion of the functional film which is within an outer area outside the injection seals, and the thickness of the functional film provided in the outer area is substantially the same as that of the functional film in an inner area within the injection seals. Thus, it is possible to provide a uniform cell gap regardless of the thickness of the functional film. Preferably, the functional film comprises a color filter. The color filter has a thickness of about 1 to 2 $\mu$m, which is greater than those of other functional films, thereby providing an even more uniform cell gap.

In a preferred embodiment, the liquid crystal display panel of the present invention is an STN liquid crystal display panel or a ferroelectric liquid crystal display panel. As described above, in an STN liquid crystal display panel or a ferroelectric liquid crystal display panel, display unevenness can be caused by even a very small cell gap variation due to an undulation of the substrate. Therefore, the method of the present invention, which provides a uniform cell gap, is very useful.

Thus, the invention described herein makes possible the advantages of: (1) providing a method for producing a liquid crystal display panel which provides a uniform cell gap in the vicinity of an injection seal, thereby enabling the liquid crystal display panel to perform a high quality display; and (2) providing a method for producing a liquid crystal display panel which eliminates a cell gap variation caused by a stress distortion due to a temporary securing section, or the like.

These and other advantages of the present invention will become apparent to those skilled in the art upon reading and understanding the following detailed description with reference to the accompanying figures.

BRIEF DESCRIPTION OF THE DRAWINGS

FIG. 11 schematically illustrates an undulation of a substrate in a liquid crystal display panel produced by a method according to an embodiment of the present invention.

FIG. 12 schematically illustrates an undulation of a substrate in a liquid crystal display panel produced by a method of a comparative example.

DESCRIPTION OF THE PREFERRED EMBODIMENTS

Hereinafter, embodiments and examples of the present invention will be described in detail with reference to the accompanying figures. It is noted, however, that the present invention is not limited to these particular embodiments and examples disclosed herein.

Figure 1:
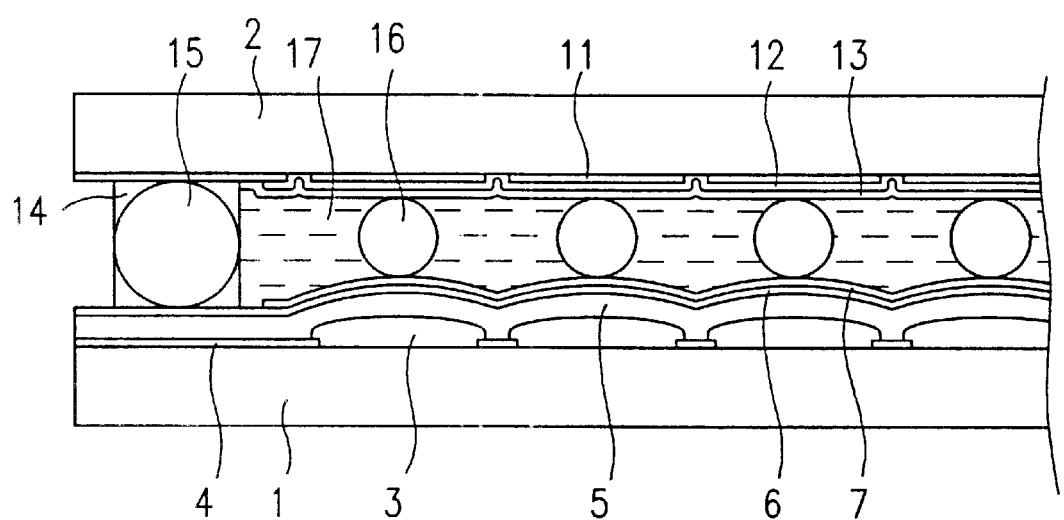
FIG. 1 is a cross-sectional view illustrating a portion of a color STN liquid crystal display panel produced by a method according to an embodiment of the present invention.

FIG. 1 is a cross-sectional view illustrating a color STN liquid crystal display panel produced by a production method of the present invention. In FIG. 1, a pair of substrates 1 and 2 are transparent plates such as glass plates, transparent synthetic resin plates or the like. R (red), G (green) and B (blue) picture elements 3, a black mask 4 covering intervals between the picture elements 3, an overcoat layer 5 functioning as a protective layer, a transparent display electrode 6 of ITO (Indium Titanium Oxide) or the like, and an alignment film 7 are formed in this order on one of the substrates, e.g., the substrate 1. In addition, a transparent display electrode 11, an insulative film 12 and an alignment film 13 are formed in this order on the other substrate, e.g., the substrate 2. After being provided with the various thin films (functional films), the pair of substrates 1 and 2 are attached together via an injection seal 14 (e.g., a thermosetting one-component epoxy sealant, a UV-curable resin, a UV/thermo-setting resin, or the like). The injection seal 14 is provided along a peripheral portion of at least one of the substrates 1 and 2. In the examples described in this specification, a thermosetting one-component epoxy sealant is used as the injection seal 14.

A large number of in-seal spacers 15 (e.g., glass beads, glass fiber, plastic beads, or the like) are mixed in the injection seal 14. Moreover, a large number of in-cell spacers 16 (e.g., plastic beads, glass beads, glass fiber, or the like) are dispersed in each area surrounded by the injection seal 14 (the liquid crystal injection area). The spacers 15 and 16 define the cell gap between the pair of substrates 1 and 2. A liquid crystal material is injected into this gap, thus forming a liquid crystal layer 17.

The injection seal 14 may be formed on either one of the substrates 1 and 2. For example, the injection seal 14 may be formed on the substrate 1, which is then attached to the substrate 2.

Embodiment 1

Hereinafter, a method for producing a color STN liquid crystal display panel of FIG. 1 according to one embodiment of the present invention will be described.

First, materials used for producing the color STN liquid crystal display panel will be described. A soda glass plate having an external dimension of about 370×480 mm and a thickness of about 0.7 mm is used for the substrates 1 and 2. Two liquid crystal cells are produced from these substrates 1 and 2, as will be described later. A color filter is formed in advance on at least one of the two glass plates. A plastic substrate or the like, may also be used in place of the glass plates 1 and 2.

An epoxy resin (e.g., XN-21S: produced by Mitsui Toatsu Chemicals, Inc.) is used for the injection seal 14 and for a dummy seal (described later). A large number of glass beads are premixed in the epoxy resin as the inseal spacers 15.

The picture elements 3, the black mask 4, the overcoat layer 5, the display electrode 6 and the alignment film 7 are formed in this order on one of the glass plates, for each of two liquid crystal cell areas. In addition, the transparent display electrode 11, the insulative film 12 and the alignment film 13 are formed in this order on the other glass plate, for each of two liquid crystal cell areas. Then, an alignment process (e.g., a rubbing process, an alignment process using a light, or the like) is performed on the alignment films 7 and 13.

Figure 2:
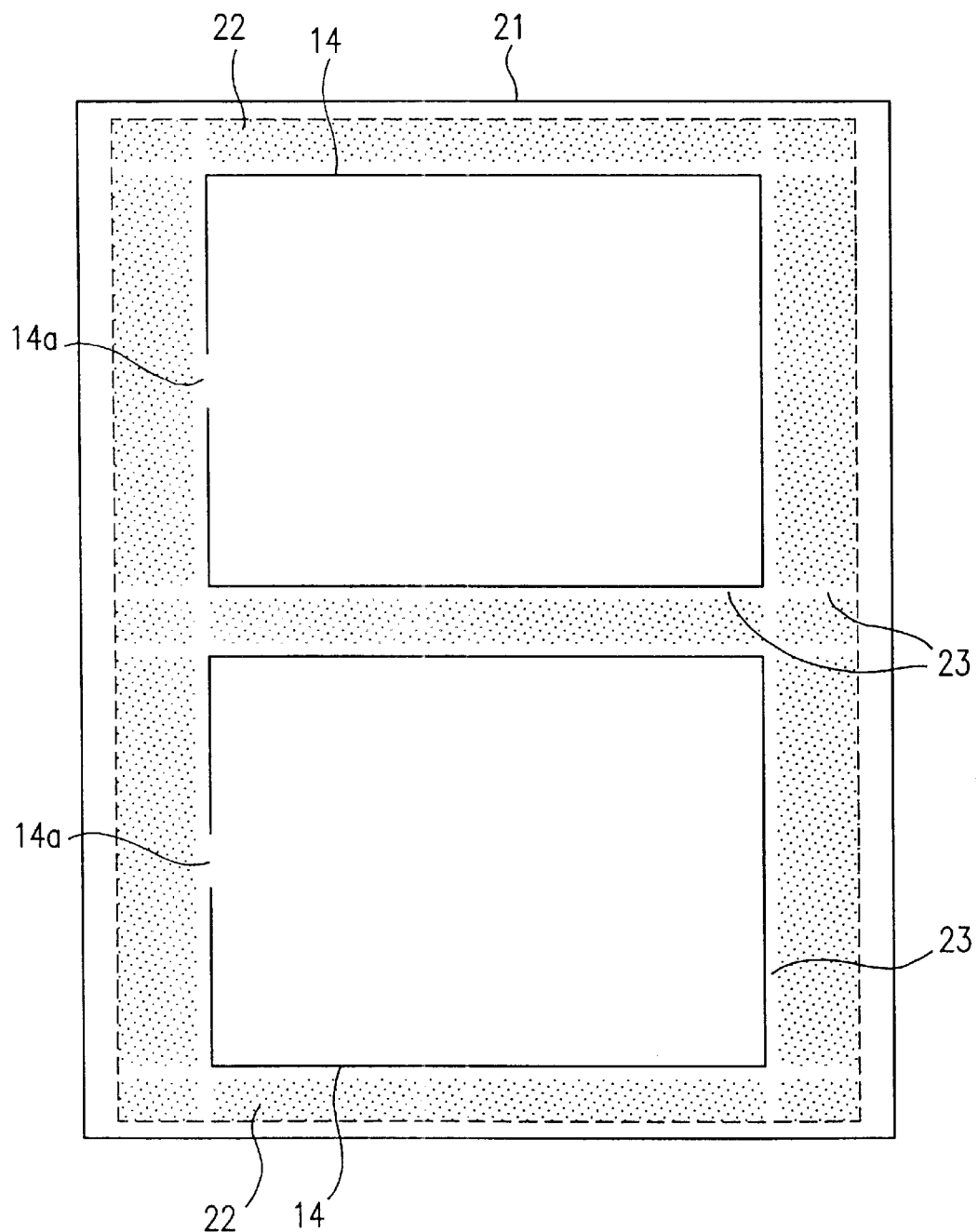
FIG. 2 is a plan view illustrating an injection seal and a dummy seal provided on a glass plate used in a method according to an embodiment of the present invention.

Thereafter, as illustrated in FIG. 2, the injection seal 14 and a dummy seal 22 are formed on one of a pair of glass plates (e.g., a glass plate 21) by applying an epoxy resin thereon with a screen printing method. If the glass plate 21 is the glass plate which is provided with a color filter, the dummy seal 22 is formed only in a "dummy color filter area" (i.e., an area outside the injection seal 14 and within the color filter area, as defined by the dashed line in FIG. 2). If the glass plate 21 is not the one with a color filter, the dummy seal 22 is formed so that the dummy seal 22 only overlaps the dummy color filter area when the glass plate is attached to the other glass plate which is provided with a color filter. The dummy seal 22 is formed so as not to exist on a scribe line 23 on each glass plate.

As is apparent from FIG. 2, the injection seal 14 is formed in a linear pattern which surrounds a liquid crystal injection area. On the other hand, the dummy seal 22 is formed by providing a large number of sealant particles in a regular arrangement. Preferably, each sealant particle has a circular cross section. The diameter of each sealant particle is in a range of about 0.2 mm to about 1 mm and, preferably, the same diameter as the width of the injection seal 14 (e.g., about 0.4 mm). The interval between adjacent sealant particles is in a range of about 0.6 mm to about 4 mm and, preferably, about 2 mm, for example, in view of facilitating the process of printing the dummy seal.

Figure 3:
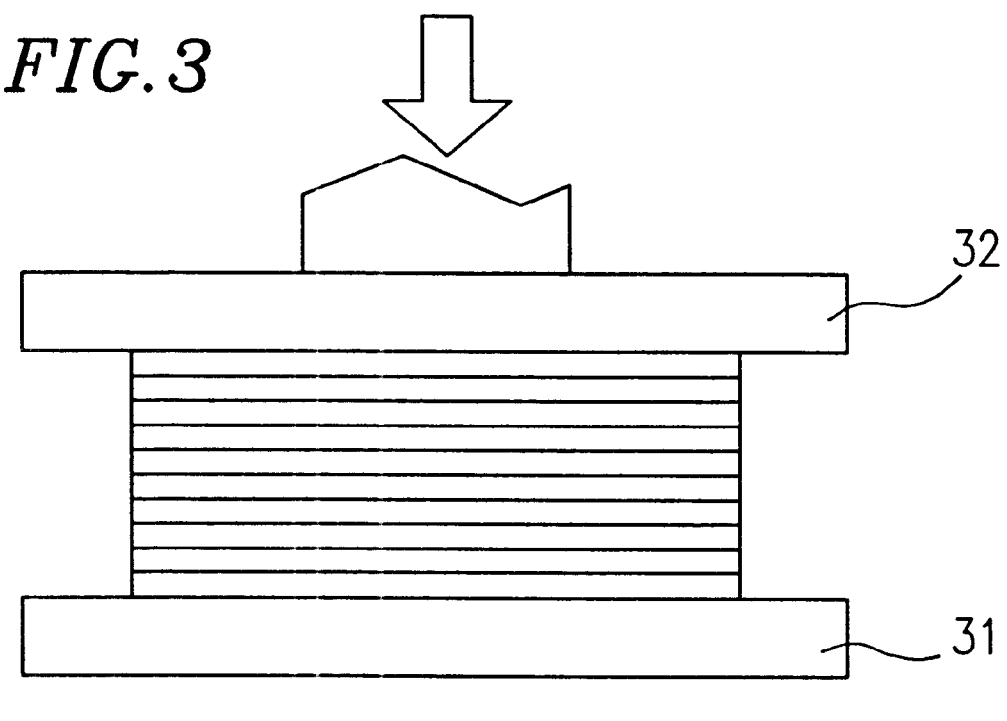
FIG. 3 is a diagram illustrating a glass plate pressing process performed in a method according to an embodiment of the present invention.

Next, the injection seal 14 and the dummy seal 22 are formed on one of the pair of the glass plates, and the glass plates are attached to each other. Then, as illustrated in FIG. 3, a plurality of pairs of glass plates are sandwiched between a pair of press plates 31 and 32, and are pressed (e.g., at about 0.8 kg/cm$^2$) while being heated (e.g., to about 180° C.). Thus, each pair of glass plates are attached to each other via the injection seal 14 and the dummy seal 22.

An after-bake process is performed for the pair of glass plates attached together, after which the glass plate is severed along the scribe lines 23, as illustrated in FIG. 2, so as to produce two cells. Then, a liquid crystal material is injected into the liquid crystal injection area of each cell surrounded by the injection seal 14, and an injection port 14a, as illustrated in FIG. 2, is sealed, thereby producing a complete liquid crystal cell, as illustrated in FIG. 1. In this case, two liquid crystal cells are provided from the two glass plates.

Thus, when the glass plates are attached together with the dummy seal 22 being provided only in the dummy color filter area thereof, as described above, the glass plates are supported by the sealant particles of the dummy seal 22 (i.e., at a plurality of points), and the stress acting upon each glass plate is thus diffused, thereby providing a uniform cell gap.

Moreover, when attaching the glass plates together, the air between the glass plates is sufficiently dispersed, whereby it is possible to attach the glass plates together while maintaining a uniform cell gap therebetween. Moreover, the sealant particles of the dummy seal 22 expand uniformly, whereby it is possible to provide a uniform cell gap. Furthermore, since the dummy seal 22 is formed only in the dummy color filter area, the cell gap is not varied due to the thickness of the color filter (about 1 µm to about 2 µm). It is noted, however, that in addition to the color filter, other functional films can also cause such a cell gap variation. In order to prevent the cell gap from being varied due to a functional film, the dummy seal 22 should be formed only in an area of the functional film outside the injection seal 14. The term "functional film" as used herein refers to a thin film such as ITO, an inorganic film, an insulative film, an alignment film, a protective layer, or the like.

EXAMPLE 1

The cell gap uniformity of the liquid crystal display panel produced by the production method described in the above-described embodiment was experimentally examined. The results will be described hereinafter.

In the present example, a 12.1-inch color STN liquid crystal display panel having a structure as illustrated in FIG. 1 (cell gap: about 6.7 µm) was examined.

Figure 4A:
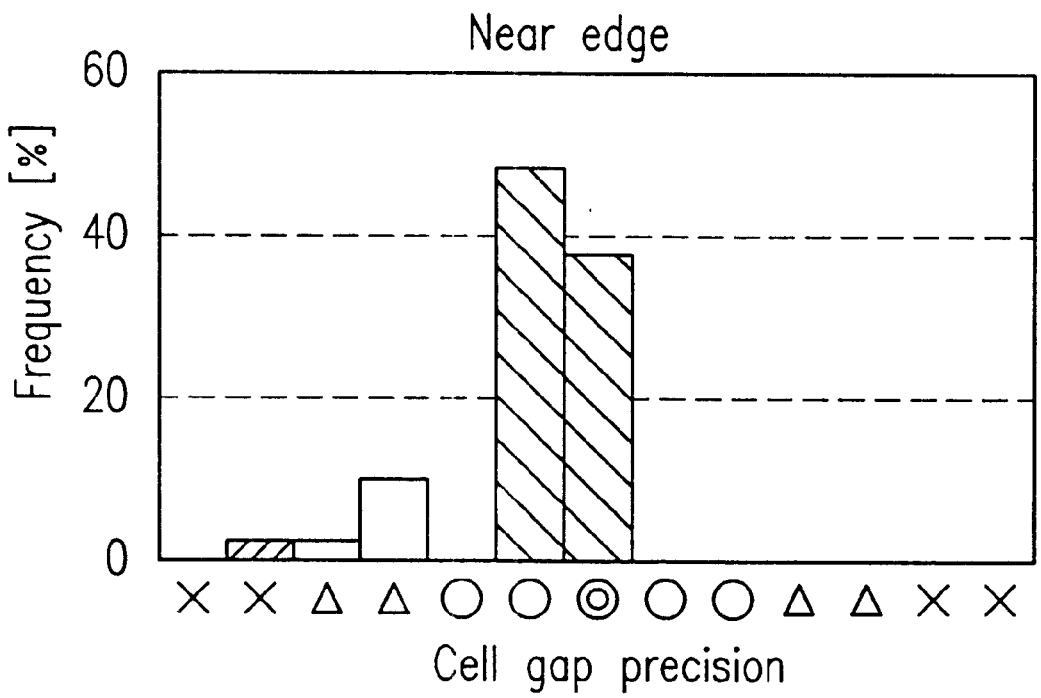
FIGS. 4A and 4B are graphs illustrating the evaluation of a liquid crystal display panel produced by a method according to an embodiment (Example 1) of the present invention, where glass beads having a diameter of about 6.8 μm are used as spacers to maintain the cell gap.
Figure 4B:
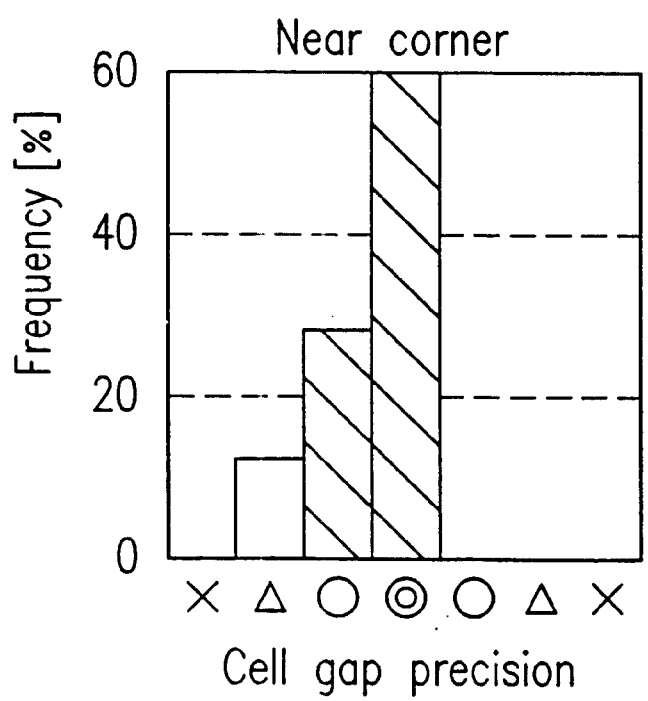
Figure 5A:
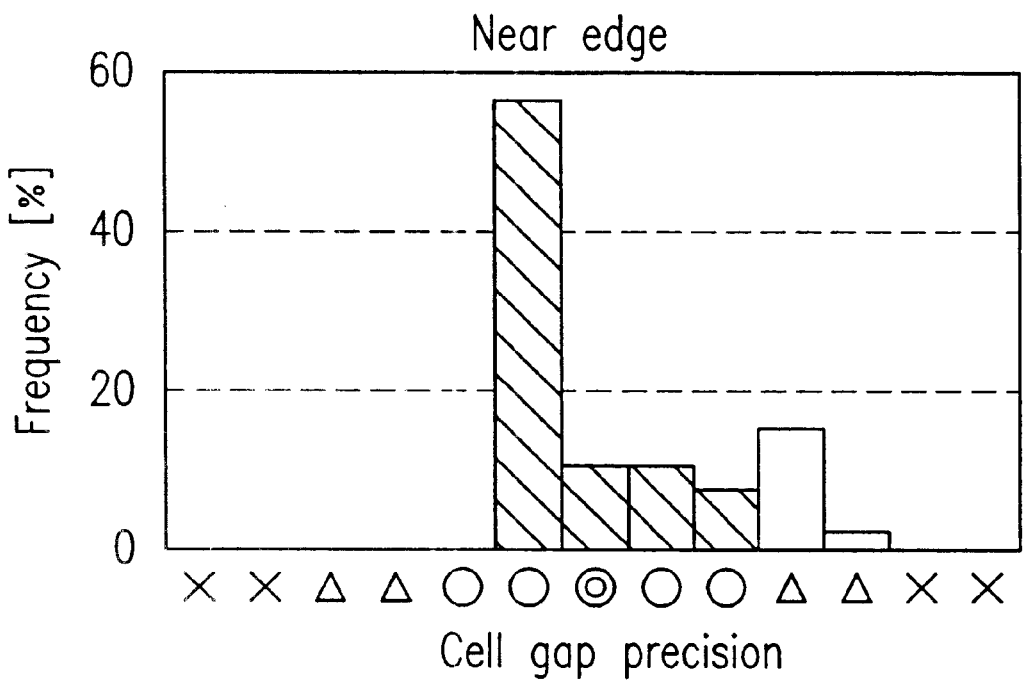
FIGS. 5A and 5B are graphs illustrating the evaluation of a liquid crystal display panel produced by a method according to an embodiment (Example 1) of the present invention, where glass beads having a diameter of about 6.9 μm are used as spacers to maintain the cell gap.
Figure 5B:
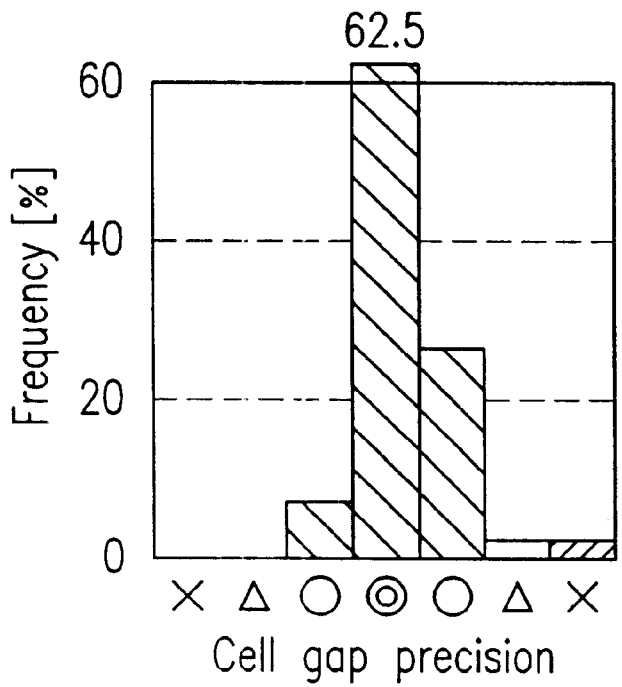
Figure 6A:
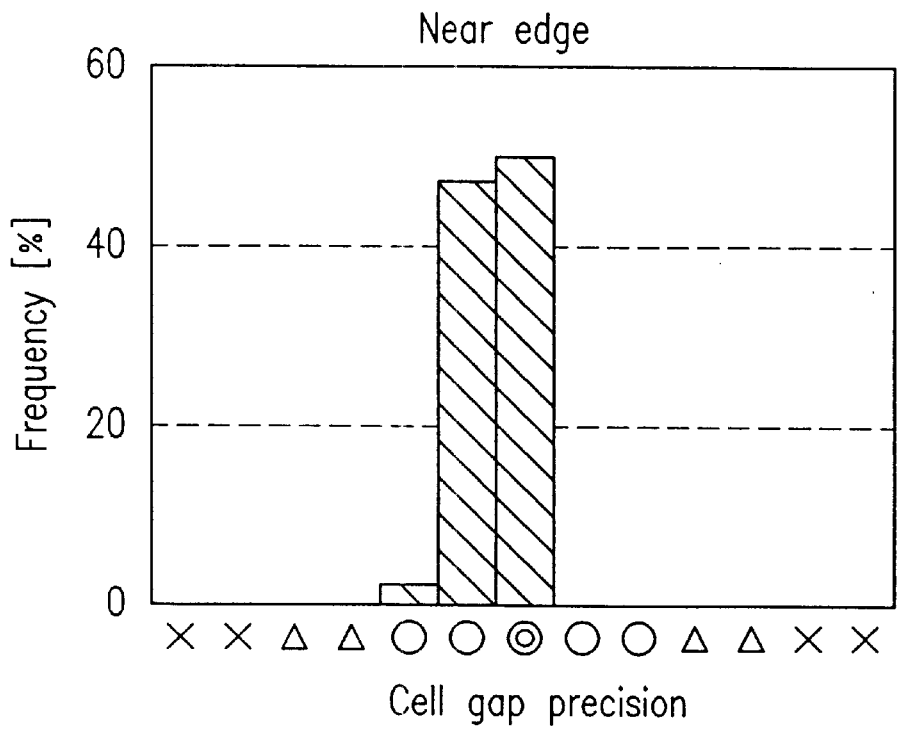
FIGS. 6A and 6B are graphs illustrating the evaluation of a liquid crystal display panel produced by a method according to an embodiment (Example 1) of the present invention, where glass beads having a diameter of about 7.0 μm are used as spacers to maintain the cell gap.
Figure 6B:
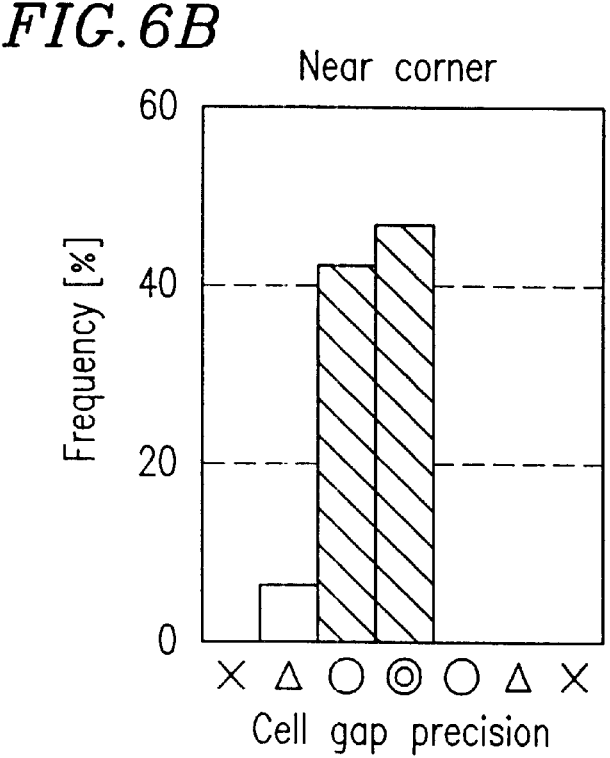

FIGS. 4A and 4B illustrate the experimental results obtained when glass beads having a diameter of about 6.8 µm as the in-seal spacers 15 are mixed in the sealant at a concentration of about 8 wt %; FIGS. 5A and 5B illustrate the experimental results obtained when glass beads having a diameter of about 6.9 µm are mixed in the sealant at a concentration of about 8 wt %; and FIGS. 6A and 6B illustrate the experimental results obtained when glass beads having a diameter of about 7.0 µm are mixed in the sealant at a concentration of about 8 wt %.

COMPARATIVE EXAMPLE 1

Figure 7:
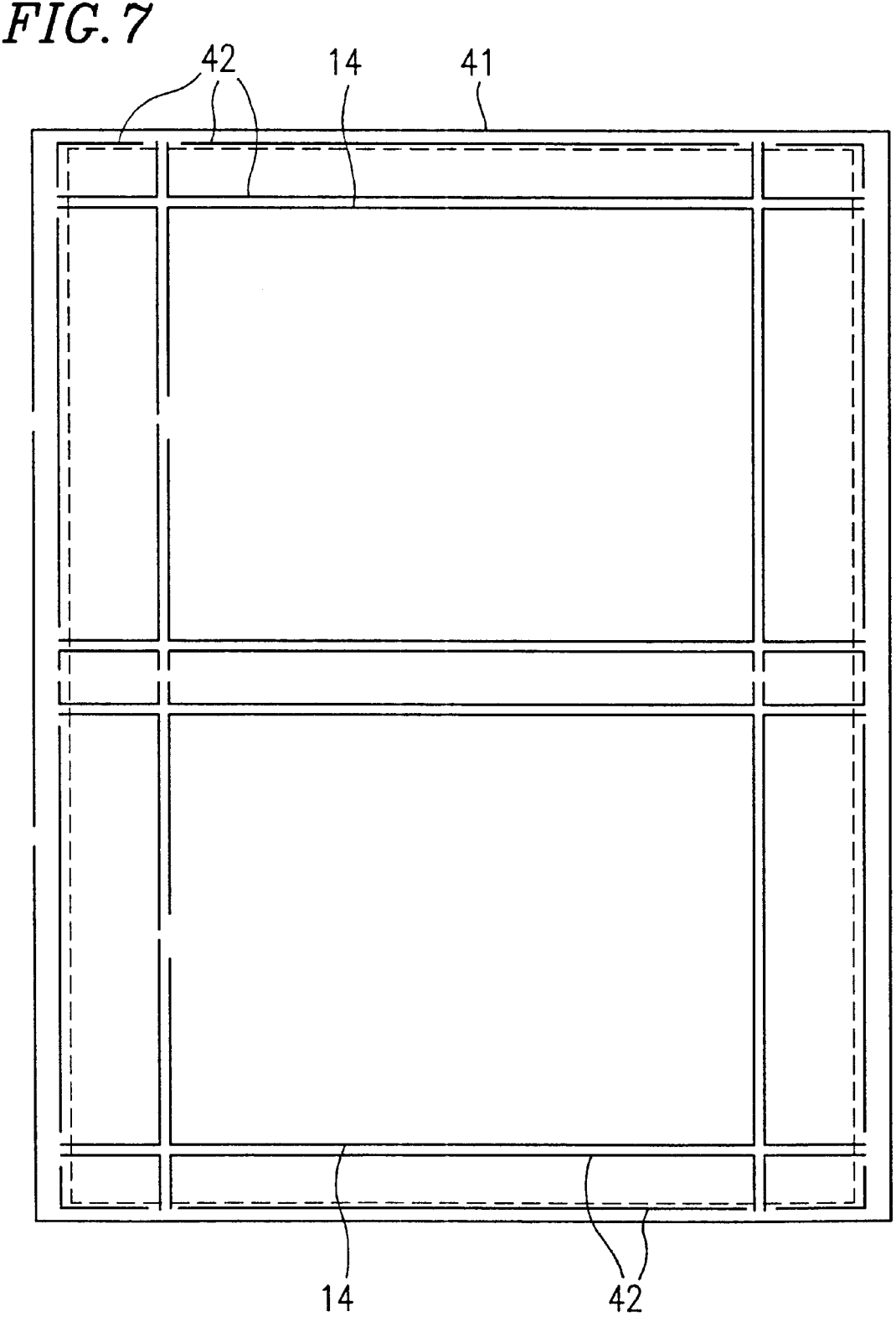
FIG. 7 is a plan view illustrating an injection seal and an auxiliary seal provided on a glass plate used for producing a liquid crystal display panel of a comparative example.

FIG. 7 illustrates a liquid crystal cell of Comparative Example 1. As illustrated in FIG. 7, the injection seal 14 and the linear auxiliary seals 42 are formed on a glass plate 41, and the glass plate 41 is attached to the other glass plate. Then, the glass plate is scribed and broken to obtain liquid crystal cells of Comparative Example 1, whose cell gaps were experimentally examined.

Figure 8A:
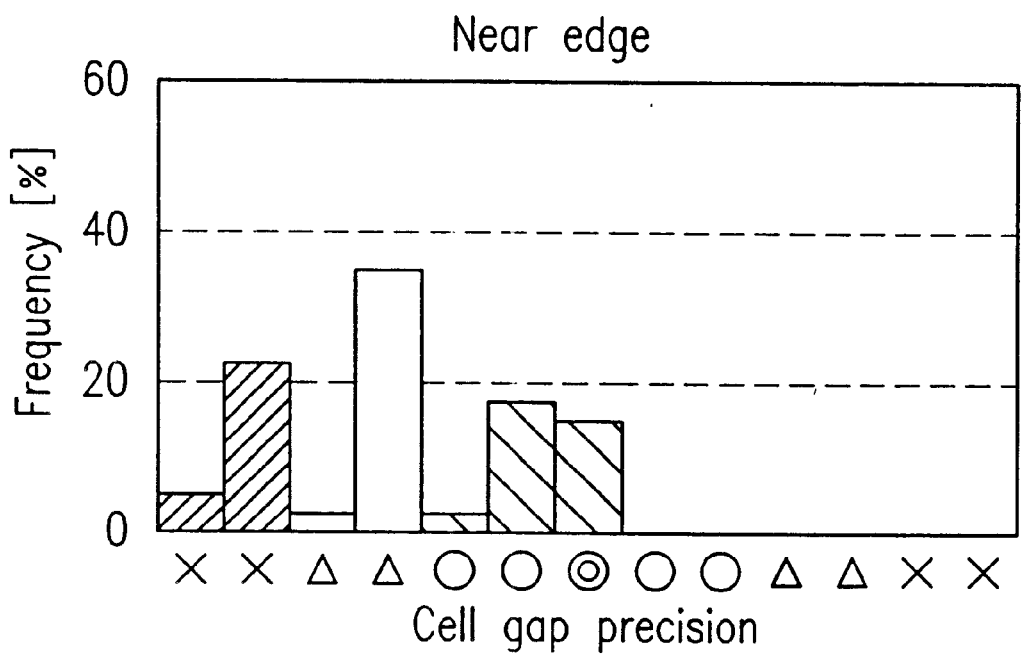
FIGS. 8A and 8B are graphs illustrating the evaluation of a liquid crystal display panel produced by a method of Comparative Example 1, where glass beads having a diameter of about 6.8 μm are used as spacers to maintain the cell gap.
Figure 8B:
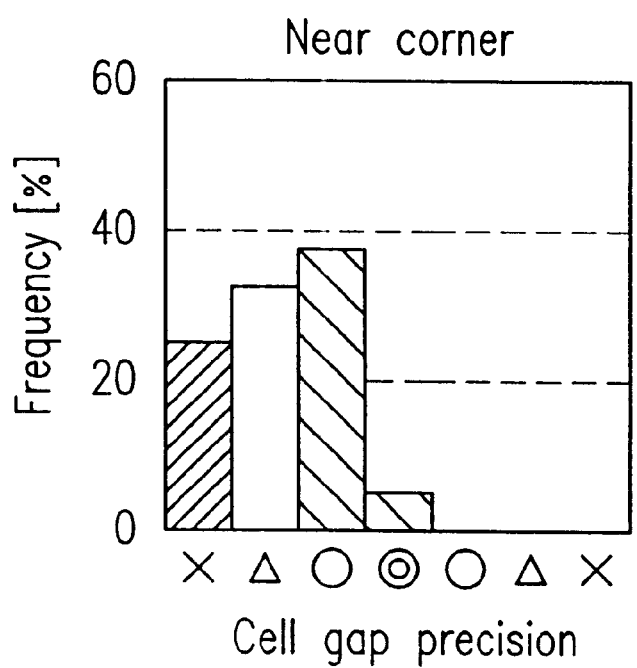
Figure 9A:
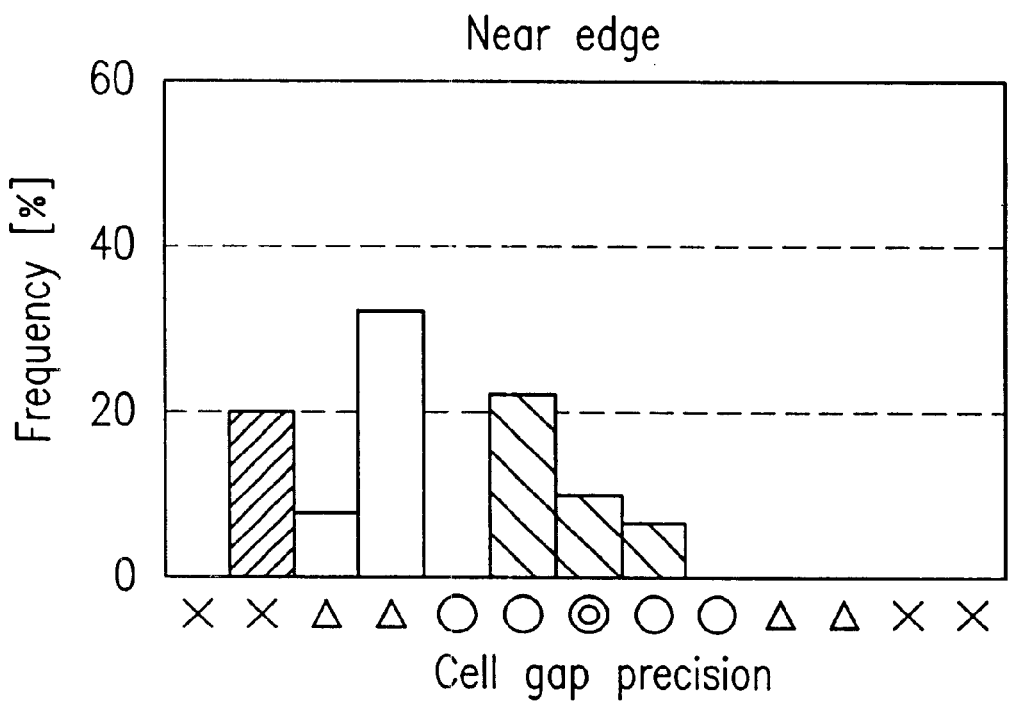
FIGS. 9A and 9B are graphs illustrating the evaluation of a liquid crystal display panel produced by a method of Comparative Example 1, where glass beads having a diameter of about 6.9 μm are used as spacers to maintain the cell gap.
Figure 9B:
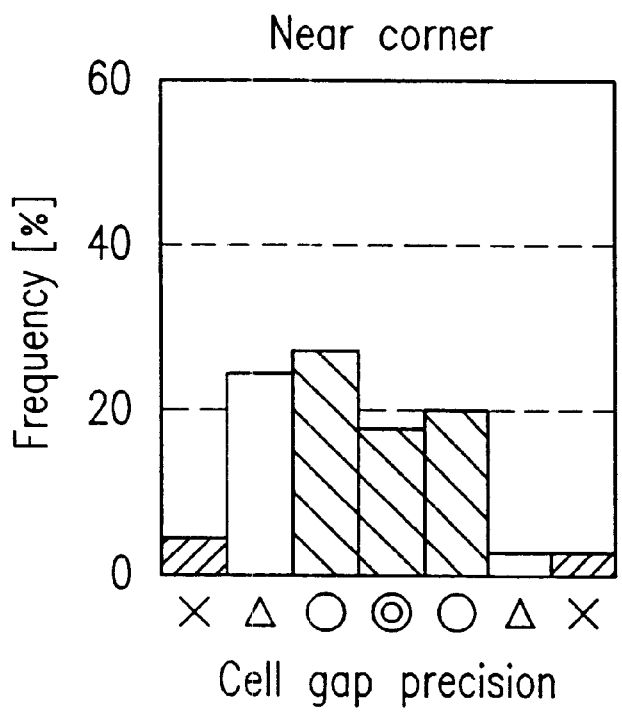
Figure 10A:
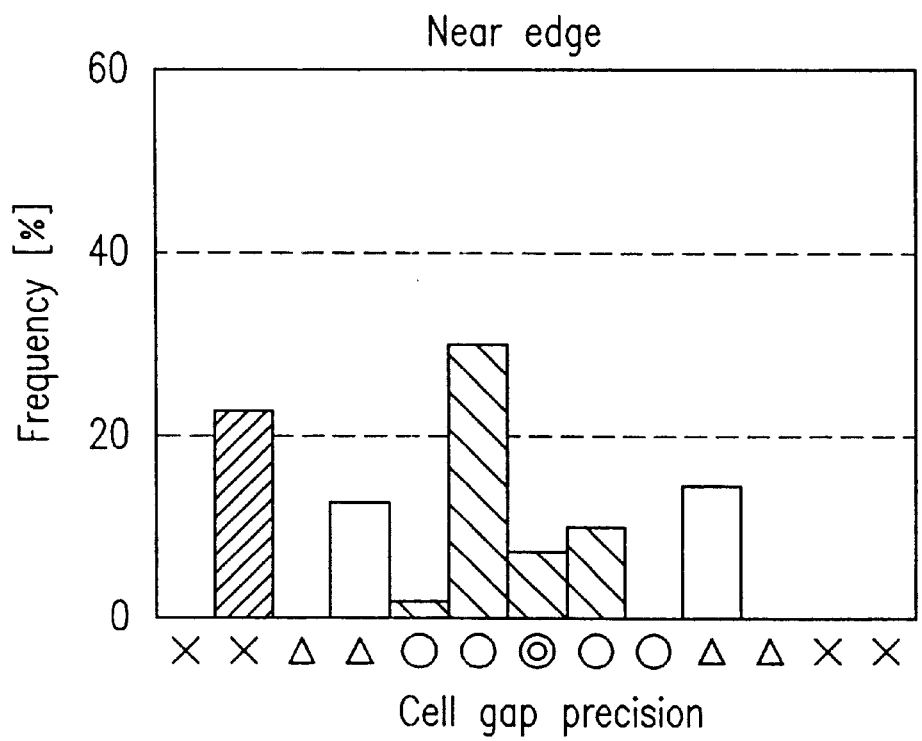
FIGS. 10A and 10B are graphs illustrating the evaluation of a liquid crystal display panel produced by a method of Comparative Example 1, where glass beads having a diameter of about 7.0 μm are used as spacers to maintain the cell gap.
Figure 10B:
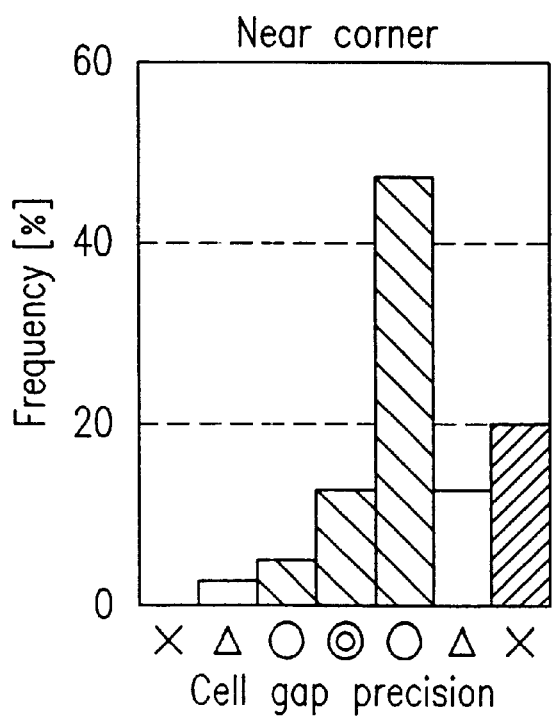

FIGS. 8A and 8B illustrate the experimental results obtained when glass beads having a diameter of about 6.8 µm as the in-seal spacers 15 are mixed in the sealant at a concentration of about 8 wt %; FIGS. 9A and 9B illustrate the experimental results obtained when glass beads having a diameter of about 6.9 µm are mixed in the sealant at a concentration of about 8 wt %; and FIGS, 10A and 10B illustrate the experimental results obtained when glass beads having a diameter of about 7.0 µm are mixed in the sealant at a concentration of about 8 wt %.

For each of Example 1 and Comparative Example 1, 50 sample liquid crystal display panels were produced and evaluated.

FIGS. 4A, 5A, 6A, 8A, 9A and 10A each illustrate a graph of a cell gap evaluation made in the vicinity of each of the four edges of the liquid crystal injection area. Moreover, FIGS. 4B, 5B, 6B, 8B, 9B and 10B each illustrate a graph of a cell gap evaluation made in the vicinity of each of the four corners of the liquid crystal injection area.

In each of the graphs, the horizontal axis represents different levels of the cell gap, while the vertical axis represents frequencies with which liquid crystal cells having such levels of cell gap were produced (the results, shown in percentage, have been obtained from 50 samples).

The different levels of cell gap are classified as follows: too small "×"; small "Δ"; relatively small "○"; adequate "⊙"; relatively large "○"; large "Δ"; and too large "×". The symbols "⊙" and "○" represent good products, "Δ" represents non-defective marginal products, and "×" represents defective products. Those of symbols "⊙", "○" and "Δ" are considered acceptable as products.

As is apparent from comparing the graphs, the liquid crystal display panel produced in accordance with the above-described embodiment has a very small cell gap variation, and therefor a high yield of the acceptable product. On the other hand, the liquid crystal display panel of Comparative Example 1 has a large cell gap variation, and therefor a low yield of the acceptable product.

FIG. 11 schematically illustrates the undulation of the glass plate 21 of the liquid crystal display panel produced by the production method according to the above-described embodiment. As illustrated in FIG. 11, the glass plate 21 is supported by the sealant particles of the dummy seal 22, thereby dispersing the stress acting on the glass plate 21 and thus resulting in a uniform cell gap.

On the other hand, in the liquid crystal display panel of Comparative Example 1, as illustrated in FIG. 12, the glass plate 41 is supported only by the injection seal 14 and the auxiliary seal 42. In such a case, the stress acting on the glass plate 41 is more localized, thereby causing a larger undulation in the glass plate 41 and thus resulting in a non-uniform cell gap.

Moreover, interference fringes were observed in both the liquid crystal display panel of the present embodiment and the liquid crystal display panel of Comparative Example 1 when attaching the pair of substrates to each other. The respective cell gaps were evaluated based on the interference fringes.

In the liquid crystal display panel of Comparative Example 1, the interference fringes generated at an edge of the glass plate went over the auxiliary seal 42 and the injection seal 14 to the liquid crystal injection area. On the other hand, in the liquid crystal display panel of the present embodiment, the interference fringes generated at an edge of the glass plate was diffused and absorbed at the dummy seal 22, and did not reach the liquid crystal injection area. Furthermore, no interference fringe occurred between the dummy seal 22 and the injection seal 14. Thus, the cell gap of the liquid crystal display panel produced by the production method of the present embodiment is maintained precisely uniform in the vicinity of the injection seal 14 and the dummy seal 22.

Embodiment 2

Hereinafter, a method for producing the STN color liquid crystal display panel of FIG. 1 according to another embodiment of the present invention will be described while focusing on the attachment step thereof.

First, materials used for producing the color STN liquid crystal display panel will be described. A soda glass plate having an external dimension of about 370×480 mm and a thickness of about 0.7 mm is used for the substrates 1 and 2. Two liquid crystal cells are produced from these substrates 1 and 2, as will be described later. A color filter is formed in advance on at least one of the two glass plates. A plastic substrate or the like, may also be used in place of the glass plates 1 and 2.

An epoxy resin (XN-21S: produced by Mitsui Toatsu Chemicals, Inc.) is used as the injection seal 14 and a dummy seal (described later). A large number of glass beads are premixed in the epoxy resin as the in-seal spacers 15.

The picture elements 3, the black mask 4, the overcoat layer 5, the display electrode 6 and the alignment film 7 are formed in this order on one of the glass plates, for each of two liquid crystal cell areas. In addition, the transparent display electrode 11, the insulative film 12 and the alignment film 13 are formed in this order on the other glass plate 2, for each of two liquid crystal cell areas. Then, an alignment process is performed on the alignment films 7 and 13. A color filter is formed in the glass plate 1 in advance.

Thereafter, the injection seal 14 and the dummy seal 22 are formed on the glass plate 1 by applying thereon an epoxy resin containing the in-seal spacers 15 with a screen printing method.

The in-cell spacers (plastic beads) 16 are dispersed on the entire surface of the other glass plate 2, and an UV-curable resin is applied to form a temporary securing section in the vicinity of the scribe line.

Figure 13:
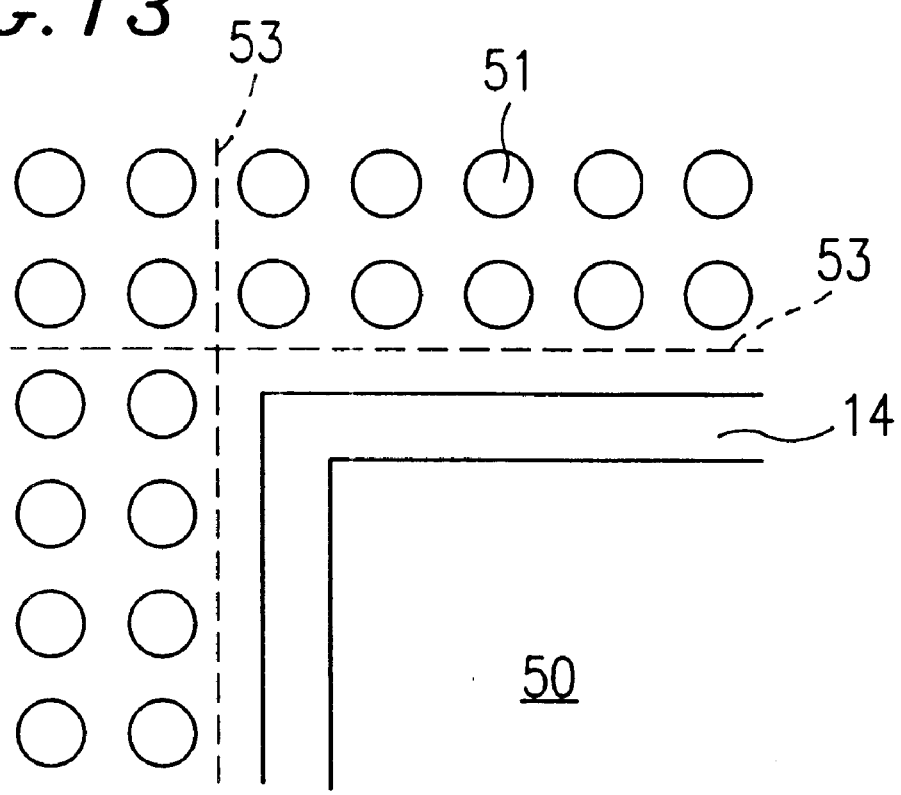
FIG. 13 is a plan view illustrating a dummy seal formed of sealant particles.

As illustrated in FIG. 13, the dummy seal is formed by providing sealant particles (preferably, with a circular cross section) in a regular arrangement.

Moreover, the dummy seal 22 (not shown in FIG. 14) is formed only in a dummy color filter area 52 (indicated as a hatched region in FIG. 14) outside the liquid crystal display panel 50. However, there is no dummy seal between the liquid crystal display panel 50 and a scribe line 53. As there occurs a gap between the inside and the outside of the liquid crystal display panel 50 depending upon the presence/absence of a color filter, the uniformity of the cell gap is decreased. Therefore, when the color filter is formed in the liquid crystal display panel 50, the dummy seal is not formed in an area outside the liquid crystal display panel 50 in which the color filter is not formed.

The color filter formed in the dummy color filter area 52 can include one or more colors. The black mask may or may not be provided.

The diameter of the sealant particles 51 is in a range of about 0.2 mm to about 1 mm and, preferably, the same diameter as the width of the injection seal 14 (e.g., about 0.4 mm). The interval between adjacent sealant particles is in a range of about 0.6 mm to about 4 mm and, preferably, about 2 mm, for example, in view of facilitating the process of printing the dummy seal. The sealant particles 51 are arranged so as not to exist on the scribe line. The dummy seal formation area is formed so as to occupy a half or more of the area defined between a temporary securing section 54 and the injection seal 14. The "dummy seal formation area" as used herein refers to the area of the substrate where the sealant particles 51 are distributed (not the total cross-section area of each sealant particle).

Figure 15:
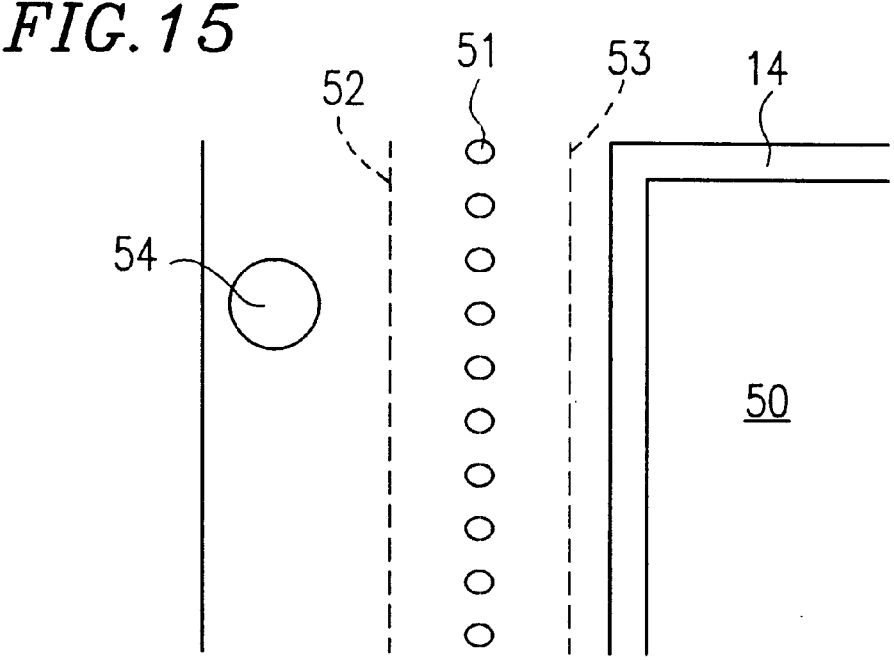
FIG. 15 is a plan view illustrating sealant particles provided in a single array.

Preferably, the sealant particles 51 are provided in an array. However, when the sealant particles 51 are provided in a single array, as illustrated in FIG. 15, the stress distortion due to the temporary securing section 54 and the waviness of the glass plates 1 and 2 are not sufficiently mitigated. In particular, the large cell gap at the temporary securing section 54 is corrected to an appropriate value by the sealant particles 51 existing in the dummy seal section. However, if the sealant particles are provided in a single array, and the cell gap is corrected to an appropriate value by the sealant particles 51, then the array of the sealant particles 51 becomes the fulcrum about which the glass plate undulates, thereby providing an increased cell gap in the liquid crystal panel section 50.

Figure 16:
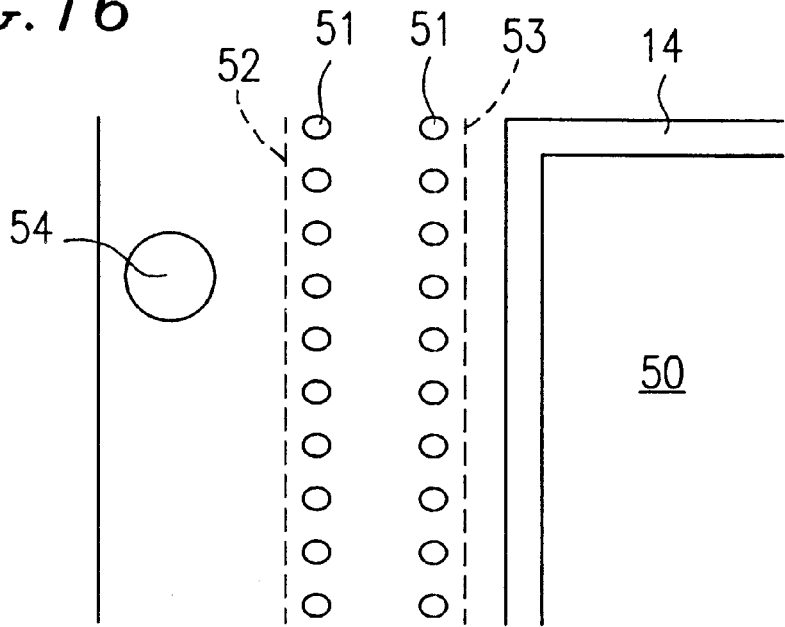
FIG. 16 is a plan view illustrating sealant particles provided in two arrays.

When the sealant particles 51 are provided in two arrays, as illustrated in FIG. 16, it may be possible to somewhat mitigate the stress distortion due to the temporary securing section 54 and the waviness of the glass plates 1 and 2, but not sufficiently. In such a case, substantially the same situation as in the single-array arrangement results, where there is a slack between the two arrays 51. The cell gap within the liquid crystal panel section 50 is closer to the appropriate value as compared to that obtained in the single-array arrangement, but it is still not satisfactory.

Figure 17:
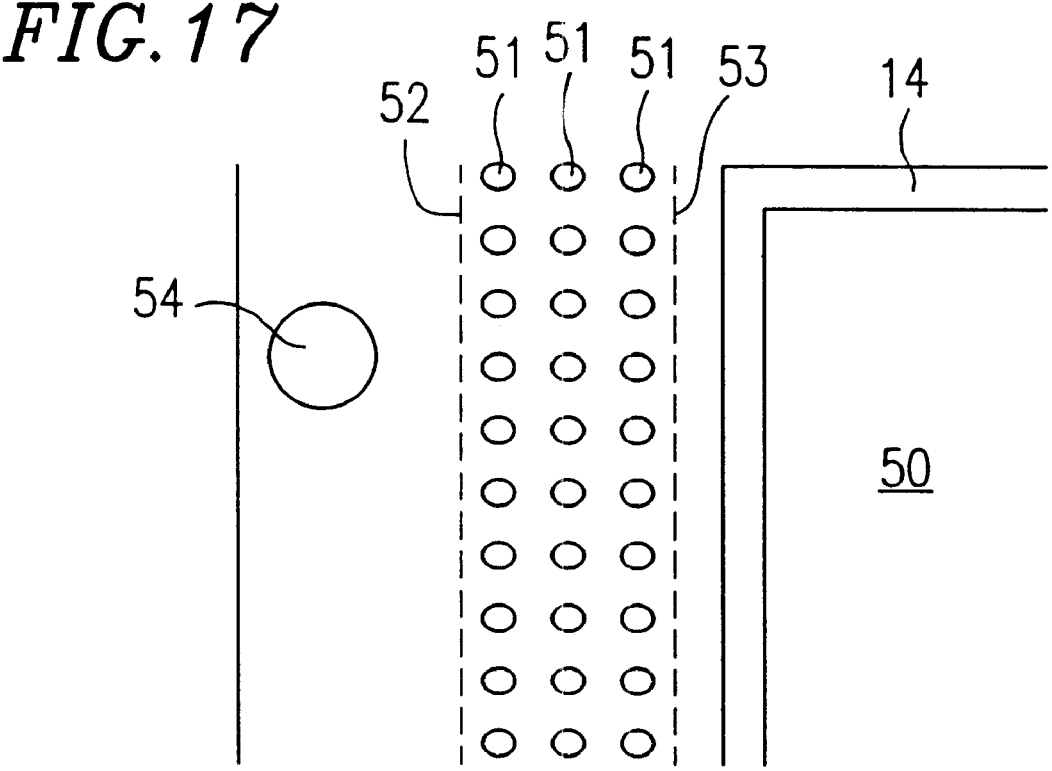
FIG. 17 is a plan view illustrating sealant particles provided in three arrays.

When the sealant particles 51 are provided in three arrays, as illustrated in FIG. 17, the stress distortion due to the temporary securing section 54 and the waviness of the glass plates 1 and 2 are absorbed by the dummy seal section (the sealant particles arranged in three arrays) and are sufficiently mitigated. In particular, the slack which occurs in the two-array arrangement is now corrected by the center array of the three arrays of the sealant particles 51, whereby the cell gap within the liquid crystal panel section 50 is corrected substantially to an appropriate value.

Then, as illustrated in FIG. 3, a plurality of pairs of glass plates are sandwiched between a pair of press plates 31 and 32, and are pressed (e.g., at about 0.8 kg/cm$^2$) while being heated (e.g., to about 180° C.). Thus, each pair of glass plates are attached to each other via the injection seal 14 and the dummy seal 22 (sealant particles 51 ).

Figure 14:
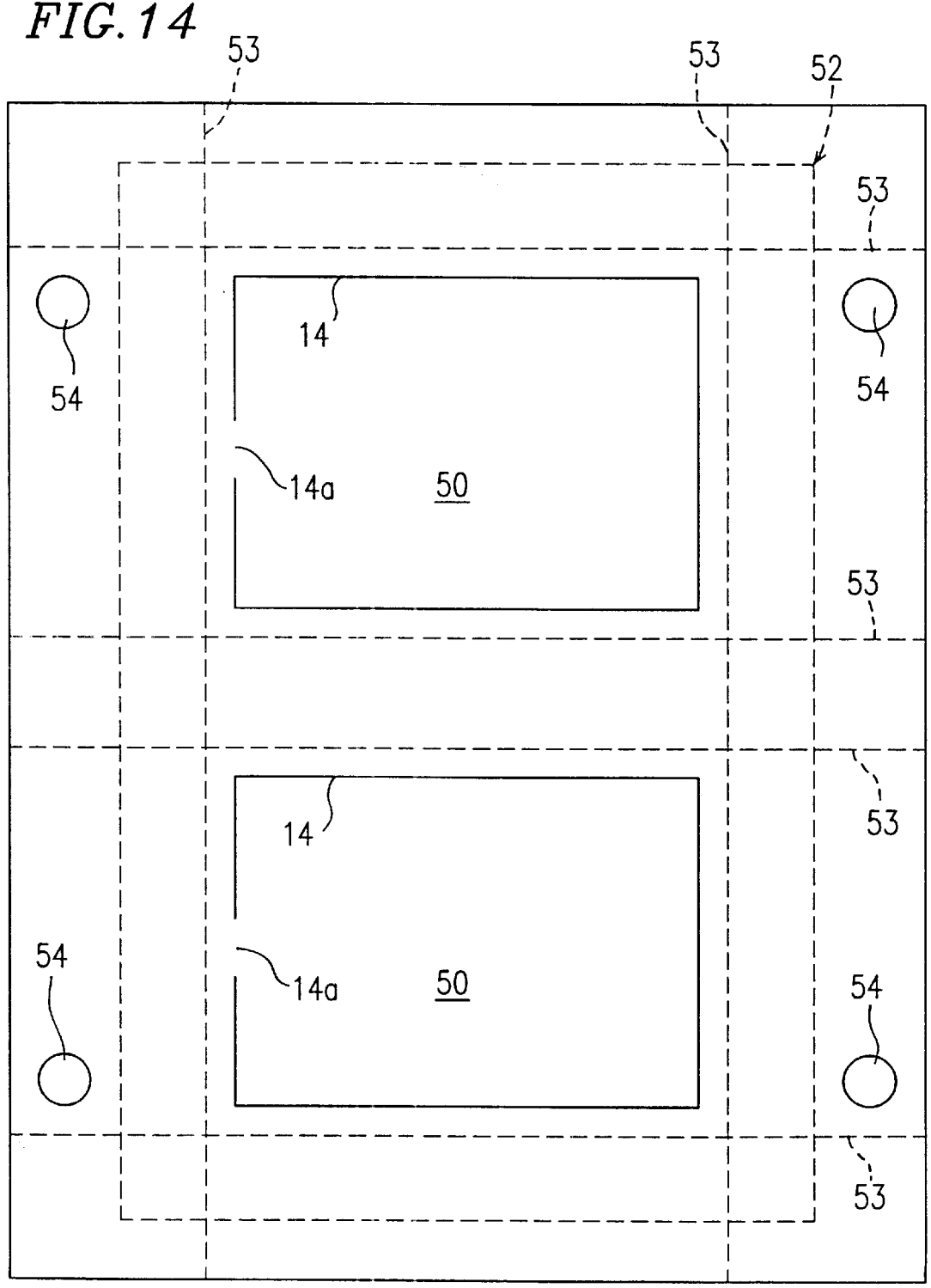
FIG. 14 is a plan view illustrating substrates after the attachment process in a method for producing a liquid crystal panel according to an embodiment of the present invention.

A post-bake process is performed for the pair of glass plates attached together, after which the glass plates are severed along the scribe line 53, as illustrated in FIG. 14, so as to produce two cells. Then, a liquid crystal material is injected into the liquid crystal injection area of each cell surrounded by the injection seal 14, and an injection port 14a, as illustrated in FIG. 14, is sealed, thereby producing a complete liquid crystal cell, as illustrated in FIG. 1.

EXAMPLE 2

Figure 18:
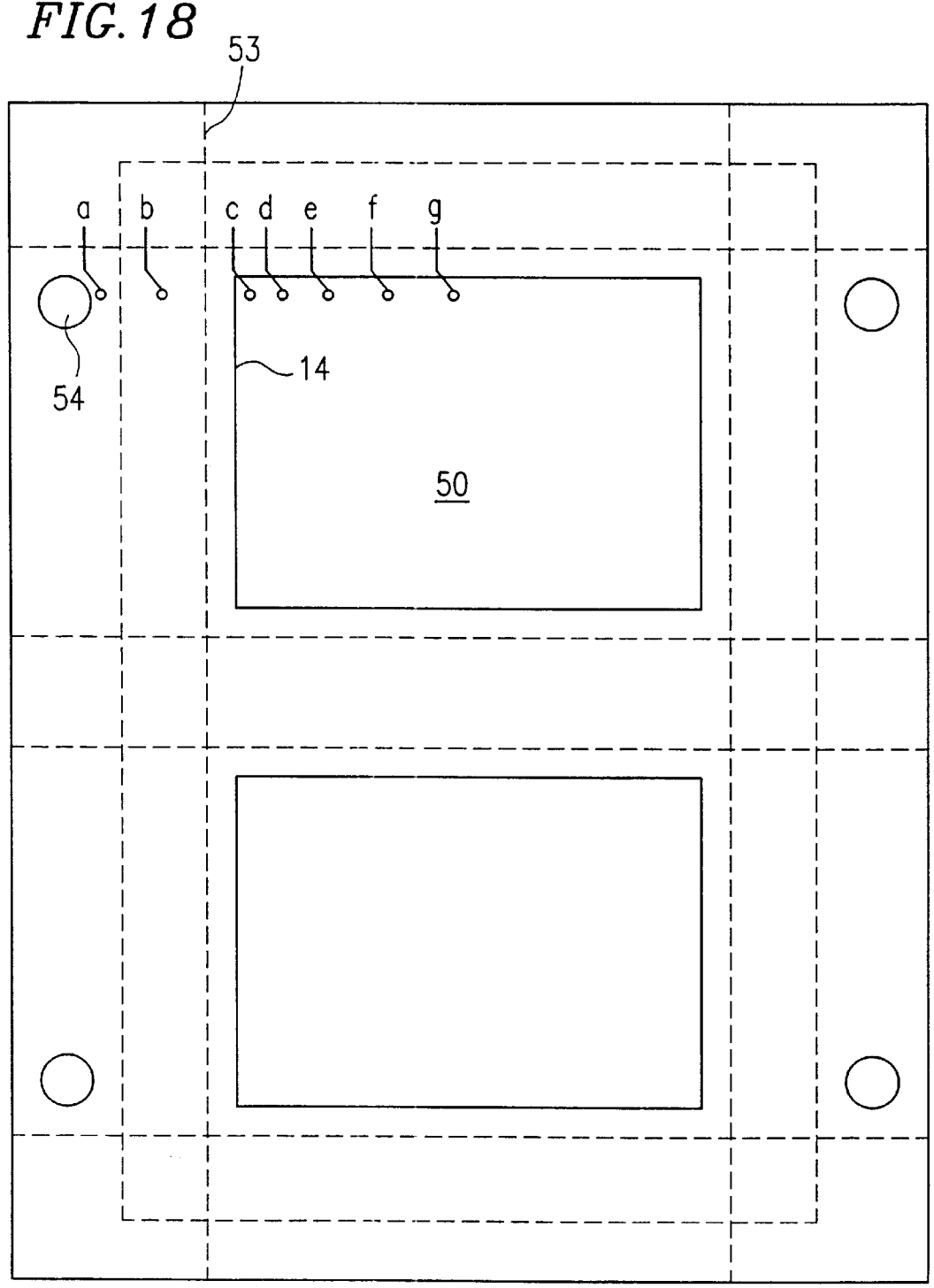
FIG. 18 is a plan view illustrating positions of a panel at which the cell gap is measured in Example 2 and in Comparative Example 2.

The cell gap of a liquid crystal display panel produced by the production method according to the above-described embodiment was measured at different positions thereof, as indicated at a to g in FIG. 18. The results are shown in Table 1 below. The term "cell gap" normally refers to an interval between a pair of glass plates within the liquid crystal panel section 50. However, in this embodiment, the interval between the pair of glass plates outside the liquid crystal panel section 50 is also referred to as the "cell gap" for discussion purposes.

TABLE 1

| Position [mm] | a | b | c | d | e | f | g |
|---|---|---|---|---|---|---|---|
| Cell gap ($\mu$m) | 11.81 | 6.37 | 6.50 | 6.81 | 7.25 | 7.99 | 8.88 |

As shown in Table 1, when the cell gap was designed to be about 6.50 $\mu$m after liquid crystal injection, the cell gap was about 11.81 $\mu$m at position a near the temporary securing section 54; about 6.37 $\mu$m at position b in the dummy seal section 22; and about 6.50 $\mu$m, about 6.81 $\mu$m, about 7.25 $\mu$m, about 7.99 $\mu$m and about 8.88 $\mu$m, at positions c, d, e, f and g, respectively, within the liquid crystal panel section 50 from the injection seal 14 to the central portion.

Next, the resultant liquid crystal cell was severed along the scribe line 53 so as to produce two liquid crystal display panels 50. Then, a liquid crystal material is injected into the cell, thus completing the liquid crystal display panel 50. The cell gap (after the liquid crystal material injection) was controlled to be about 6.50 $\mu$m, the design value, by using a cell gap control method such as pressure sealing (when injecting a liquid crystal material, the liquid crystal display panel 50 is pressed from both sides by a contact or noncontact method, thereby discharging an excessive liquid crystal material from the liquid crystal display panel 50), pressurized injection, vacuum injection, or the like.

After the liquid crystal material was injected, the cell gap of the panel was measured at different positions successively provided within the liquid crystal display panel 50, starting from the position about 1 mm away from the injection seal 14 and to the position about 20 mm away from the injection seal 14. The results are shown in Table 2 below and FIG. 19. It is noted that the measurement positions are different from the positions a to g.

TABLE 2

| Position [mm] (Distance from seal section) | 1 | 2 | 3 | 4 | 5 | 6 | 7 | 8 | 9 | 10 |
|---|---|---|---|---|---|---|---|---|---|---|
| Cell gap ($\mu$m) | 6.505 | 6.500 | 6.497 | 6.503 | 6.507 | 6.511 | 6.516 | 6.518 | 6.518 | 6.518 |
| Position [mm] (Distance from seal section) | 11 | 12 | 13 | 14 | 15 | 16 | 17 | 18 | 19 | 20 |
| Cell gap ($\mu$m) | 6.516 | 6.516 | 6.517 | 6.517 | 6.515 | 6.514 | 6.513 | 6.517 | 6.521 | 6.524 |

Figure 19:
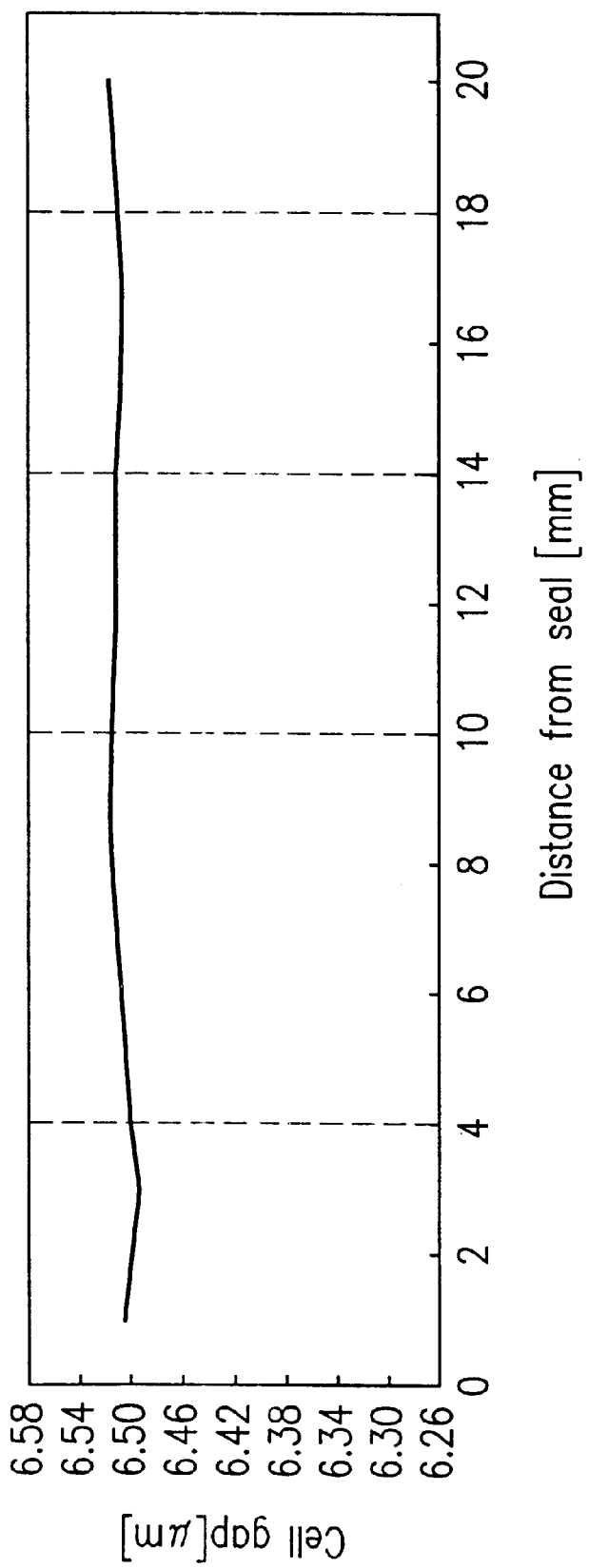
FIG. 19 is a graph illustrating the measured cell gaps in Example 2.

As shown in Table 2 and FIG. 19, the cell gap was about 6.50 $\mu$m at each of the measurement positions successively provided at an interval of about 1 mm starting from the injection seal 14 toward the center of the liquid crystal display panel 50.

COMPARATIVE EXAMPLE 2

A liquid crystal display panel of Comparative Example 2 was produced by the same method as that of Example 2 except that the auxiliary seal was formed in a two-line arrangement. The auxiliary seal was formed so as to have a width of about 0.4 mm (same as that of the injection seal) and so as not to overlap the scribe line. The cell gap was measured at positions a1 to g1 corresponding to the positions a to g. The results are shown in Table 3 below.

TABLE 3

| Position [mm] | a1 | b1 | c1 | d1 | e1 | f1 | g1 |
|---|---|---|---|---|---|---|---|
| Cell gap ($\mu$m) | 12.39 | 6.64 | 6.55 | 7.64 | 8.37 | 9.29 | 10.43 |

When the cell gap was designed to be about 6.50 $\mu$m after the liquid crystal material injection, the cell gap was about 12.39 $\mu$m at position a1; about 6.64 $\mu$m at position b1; about 6.55 $\mu$m at position c1; about 7.64 $\mu$m at position d1; about 8.37 $\mu$m at position e1; about 9.29 $\mu$m at position f1; and about 10.43 $\mu$m at position g1.

Next, the resultant liquid crystal cell was severed along the scribe line so as to produce two liquid crystal display panels. Then, a liquid crystal material is injected into the cell, thus completing the liquid crystal display panel. It was attempted to have a cell gap of about 6.50 $\mu$m, the design value, after the liquid crystal material injection, by using a method such as pressure sealing, pressurized injection, vacuum injection, or the like as described in Example 2. However, the cell gap was slightly larger than the design value at positions f1 and g1.

After the liquid crystal material was injected, the cell gap of the panel was measured at different positions successively provided within the liquid crystal display panel 50, starting from the position about 1 mm away from the injection seal 14 and to the position about 20 mm away from the injection seal 14. The results are shown in Table 4 and FIG. 20. It is noted that the measurement positions are different from the positions a1 to g1.

TABLE 4

| Position [mm] (Distance from seal section) | 1 | 2 | 3 | 4 | 5 | 6 | 7 | 8 | 9 | 10 |
|---|---|---|---|---|---|---|---|---|---|---|
| Cell gap ($\mu$m) | 6.427 | 6.444 | 6.476 | 6.487 | 6.500 | 6.507 | 6.513 | 6.517 | 6.518 | 6.514 |
| Position [mm] (Distance from seal section) | 11 | 12 | 13 | 14 | 15 | 16 | 17 | 18 | 19 | 20 |
| Cell gap ($\mu$m) | 6.520 | 6.521 | 6.522 | 6.522 | 6.522 | 6.519 | 6.522 | 6.526 | 6.527 | 6.531 |

Figure 20:
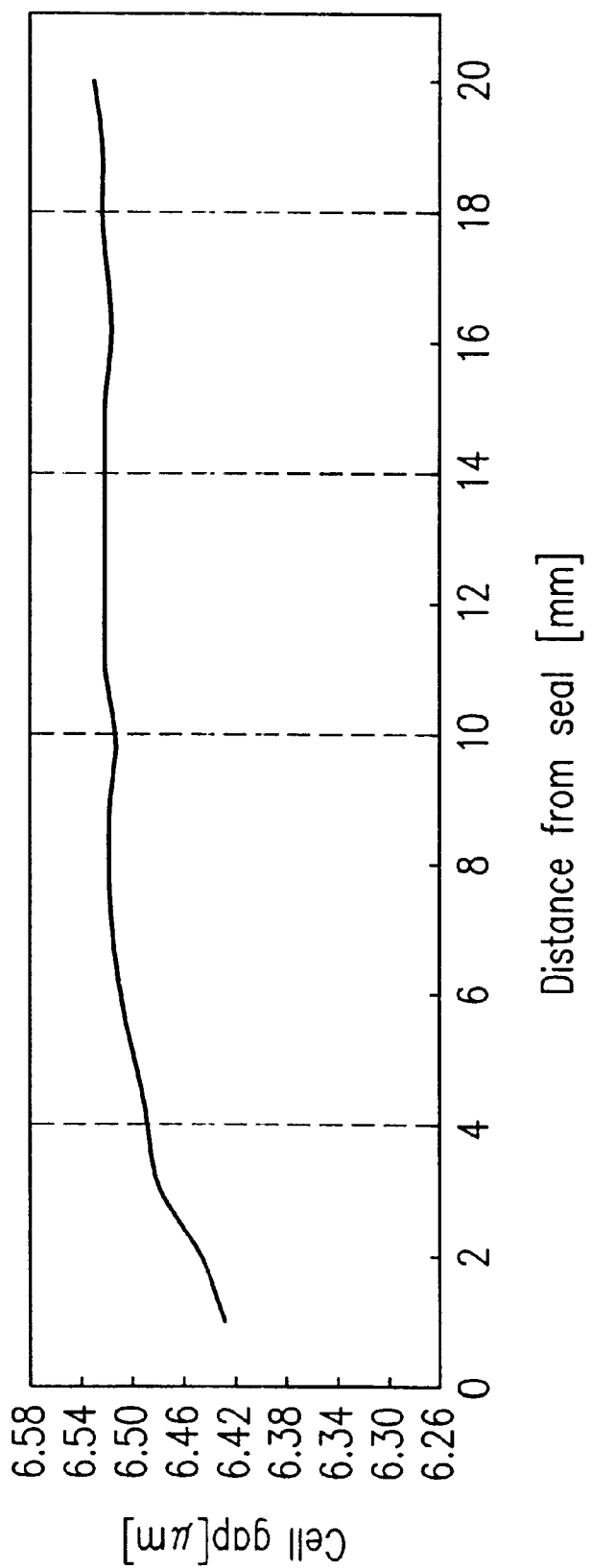
FIG. 20 is a graph illustrating the measured cell gaps in Comparative Example 2.
Figure 21:
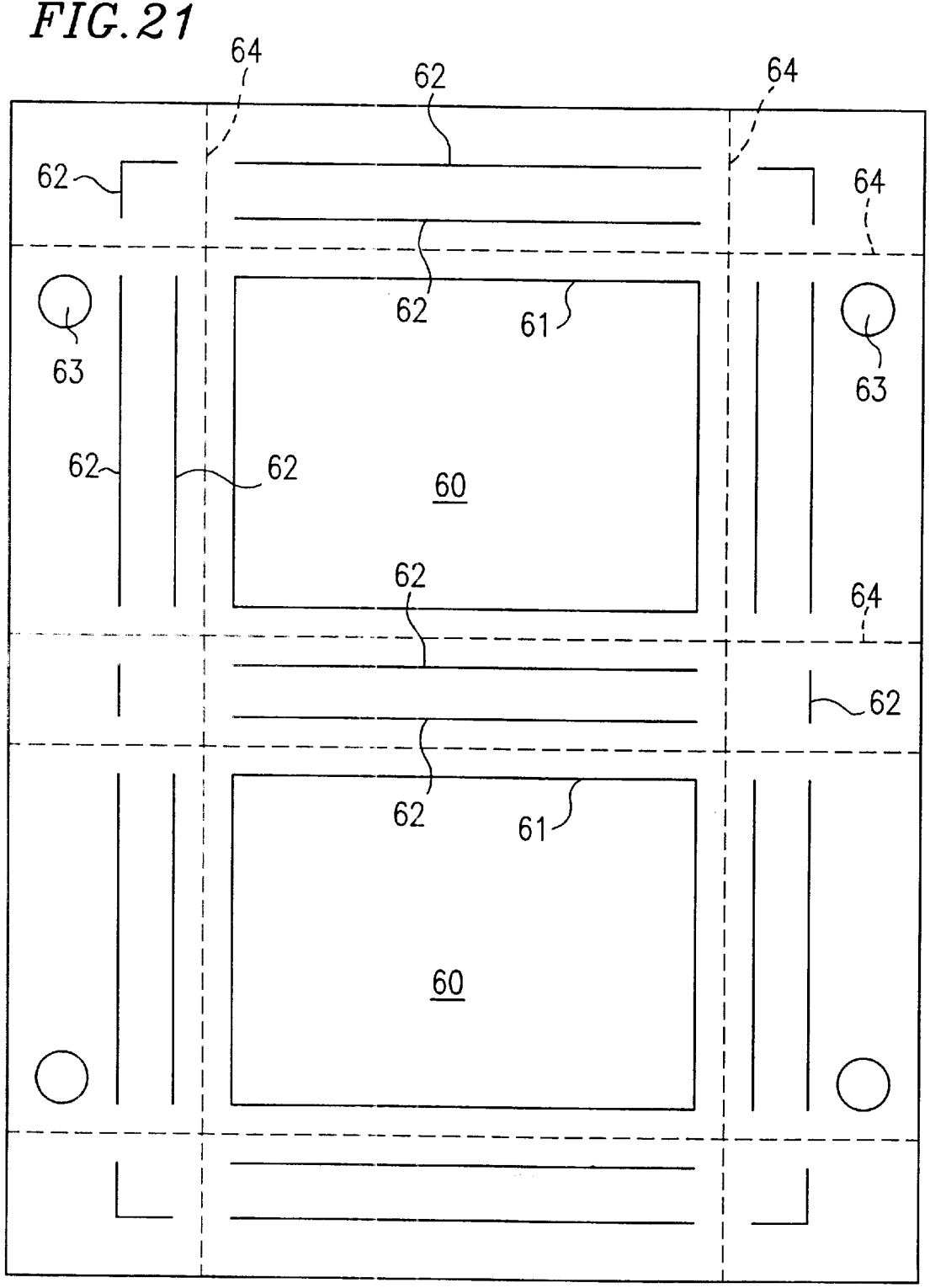
FIG. 21 is a plan view illustrating a pair of substrates after the attachment process in a conventional method.

Since the cell gap was adjusted to about 6.50 $\mu$m at positions distant from the seal section, the cell gap was small near the injection seal, as shown in the Table 4 and FIG. 20.

As described above, in accordance with the present embodiment, it is possible to mitigate the increase in the cell gap which exists from the injection seal 14 toward the center of the liquid crystal display panel 50, and to reduce the waviness of the glass plate due to the temporary securing section 54 and the dummy seal 22 and the cell gap variation due to the stress distortion.

In the above-described embodiment, the temporary securing section 54 is formed in the vicinity of the scribe line 53. However, the cell gap variation can be similarly reduced by forming the temporary securing section 54 in a position away from the scribe line 53.

By applying the present invention to a liquid crystal display panel whose display performance is very sensitive to the cell gap variation (e.g., a liquid crystal display panel which requires about ±0.1 $\mu$m cell gap precision; more particularly, those utilizing the birefringent light interference effect, TFT-driven liquid crystal display panel of the IPS mode, etc.), it is possible to obtain a liquid crystal display panel which has substantially no problem in display characteristics such as the display color regularity, domain, contrast, response, and the like. Of course, the present invention can also be applied to a liquid crystal display panel which does not require such a high (e.g., about ±0.1 $\mu$m) cell gap precision, e.g., a TFT-driven liquid crystal display panel of the TN mode, etc.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a liquid crystal display panel, comprising the steps of:
   forming a plurality of injection seals on at least one of a pair of substrates, the injection seals defining a liquid crystal injection area;
   forming a dummy seal of dispersed sealant particles regularly arranged in at least two arrays of particles outside the liquid crystal injection area;
   attaching the substrates to each other thereby sandwiching the injection seal and the dummy seal therebetween; and
   injecting a liquid crystal material into the liquid crystal injection area formed between the pair of substrates.

2. A method according to claim 1, wherein the sealant particles each have a circular cross section.

3. The method according to claim 2, wherein a diameter of each sealant particle is in a range from 0.2 mm to 1 mm.

4. A method according to claim 1, further comprising, between the attachment step and the injection step, the step of scribing and breaking the pair of substrates so as to cut off an area where the dummy seal is formed.

5. A method according to claim 1, wherein a scribe line is interposed between the injection seal and the dummy seal.

6. A method according to claim 1, wherein a functional film is provided on at least one of the pair of substrates.

7. A method according to claim 6, wherein:
   the dummy seal is formed only on a portion of the functional film which is within an outer area outside the liquid crystal injection area; and
   a thickness of the functional film provided in the outer area is substantially the same as that of the functional film in an inner area within the injection seals.

8. A method according to claim 7, wherein the functional film comprises a color filter.

9. A method according to claim 1, wherein:
   a color filter is provided on at least one of the pair of substrates; and
   a dummy seal is formed only on a portion of the color filter which is within an outer area outside the liquid crystal injection area.

10. A method according to claim 1, wherein the liquid crystal display panel is an STN liquid crystal display panel or a ferroelectric liquid crystal display panel.

11. The method according to claim 1, wherein an interval between adjacent sealant particles is in a range from 0.6 mm to 4 mm.

12. The method according to claim 1, wherein the dummy seal is formed by printing a sealant on the substrate.

13. The method according to claim 1, wherein each one of the sealant particles is formed precisely in terms of its shape.

14. A method for producing a liquid crystal display panel, comprising the steps of:
   forming a plurality of injection seals on at least one of a pair of substrates, the injection seals defining a liquid crystal injection area;
   forming a dummy seal of dispersed sealant particles regularly arranged in at least two arrays of particles outside the liquid crystal injection area;
   forming a temporary securing section for temporarily securing the pair of substrates together;
   attaching the substrates to each other so as to sandwich the injection seal, the dummy seal and the temporary securing section therebetween, and allowing the temporary securing section to be cured; and scribing and breaking the pair of substrates along a scribe line so as to cut off an area where the dummy seal is formed, wherein the dummy seal is formed by providing sealant particles having a predetermined shape in a regular arrangement.

15. A method according to claim 14, further comprising, after the scribe and break step, the step of injecting a liquid crystal material into the liquid crystal display area formed between the substrates.

16. A method according to claim 14, wherein the sealant particles have a circular cross section.

17. A method according to claim 14, wherein the scribe line is interposed between the injection seal and the dummy seal.

18. A method according to claim 14, wherein an external dimension of the dummy seal is equal to or less than a width of the injection seal.

19. A method according to claim 14, wherein the width of the dummy seal is formed to have a width which is greater than equal to ½ of a minimum distance between the temporary securing section and the injection seal.

20. A method according to claim 14, wherein the sealant particles are provided in three or more arrays between the temporary securing section and one of the injection seals which is closest to the temporary securing section.

21. A method according to claim 14, wherein a functional film is provided on at least one of the pair of substrates.

22. A method according to claim 21, wherein:

the dummy seal is formed only on a portion of the functional film which is within an outer area outside the liquid crystal injection area; and the thickness of the functional film provided in the outer area is substantially the same as that of the functional film in an inner area within the injection seals.

23. A method according to claim 22, wherein the functional film comprises a color filter.

24. A method according to claim 14, wherein the liquid crystal display panel is an STN liquid crystal display panel or a ferroelectric liquid crystal display panel.

25. A method for producing a liquid crystal display panel, comprising the steps of:

forming a plurality of injection seals on at least one of a pair of substrates, the injection seals defining a liquid crystal injection area;

forming a dummy seal of dispersed sealant particles regularly arranged in at least two arrays of particles outside the liquid crystal injection area;

attaching the substrates to each other thereby sandwiching the injection seal and the dummy seal therebetween; and injecting a liquid crystal material into the liquid crystal injection area formed between the pair of substrates, wherein an external dimension of each sealant particle is about equal to or less than a width of the injection seal, and the pair of substrates are substantially supported by the sealant particles and injection seals.

* * * * *